United States Patent [19]
Jones, Jr. et al.

[11] Patent Number: 5,473,849
[45] Date of Patent: Dec. 12, 1995

[54] BUILDING WALL AND METHOD OF CONSTRUCTING SAME

[75] Inventors: Roger H. Jones, Jr.; Ricky D. Licata, both of Reno, Nev.

[73] Assignee: Materials Technology, Limited, Reno, Nev.

[21] Appl. No.: 66,675

[22] Filed: May 24, 1993

Related U.S. Application Data

[63] Continuation-in-part of Ser. No. 890,755, May 28, 1992, abandoned.

[51] Int. Cl.⁶ ..................................................... E04B 2/00
[52] U.S. Cl. ........................... 52/424; 52/741.4; 52/699; 264/42; 249/42; 249/46
[58] Field of Search ................. 52/424–428, 169.1, 52/100, 251, 259, 236.8, 677, 698, 699, 514, 293.1, 741.1, 741.4; 249/42, 46, 213–217; 106/88; 264/42

[56] References Cited

U.S. PATENT DOCUMENTS

| | | | |
|---|---|---|---|
| 875,396 | 12/1907 | White | 52/683 |
| 1,088,290 | 2/1914 | McAllister et al. | 52/699 |
| 1,318,405 | 10/1919 | Perrott | 52/677 |
| 1,385,823 | 7/1921 | Grant | 249/216 |
| 1,499,483 | 7/1924 | Simms | 52/293.1 |
| 1,501,288 | 7/1924 | Morley | 52/259 |
| 1,795,655 | 3/1931 | MacDonald | 52/169.1 |
| 1,884,822 | 10/1932 | Parker | 52/100 |
| 1,911,626 | 5/1933 | Larzelere | 52/426 |
| 1,914,770 | 6/1933 | Duncan | 52/426 |
| 1,924,801 | 8/1933 | Olmsted | 52/236.8 |

(List continued on next page.)

FOREIGN PATENT DOCUMENTS 1400277  7/1975  United Kingdom ................... 52/425

OTHER PUBLICATIONS

Standard Specification for Structural Insulating Formboard (Cellulosic Fiber), published by ASTM, 1988, pp. 176–177.
Forming Economical Concrete Buildings, Proceedings of the Third International Conference, published 1988, cover and pages iv, v and 136–145.
Formwork for Concrete, by M. K. Hurd, published 1982, cover and title pages, and pages 4–18, 4–19, 4–37 to 4–39, 4–43 to 4–44, 4–51 and 15–25.
Guide to Formwork for Concrete, published by ACI Committee 347, 1988, pp. 530–535, 538–562.
CelloFoam, EPS Roof Deck Insulation Products brochure by Huebert Fiberboard, Inc., year of publication unknown.

Primary Examiner—James L. Ridgill, Jr.
Attorney, Agent, or Firm—Townsend and Townsend Khourie and Crew

[57] ABSTRACT

A simple, environmentally benign building for on-site erection and fabrication is made of monolithic, architectural, structural walls, beams, girders, joists and panels of relatively high physical strength which exhibit great durability and resistance to fire, wind and seismic damage and which have highly desirable acoustic and thermal transfer characteristics. The wall is constructed by casting a core of flowable fibrous, foam-cement mix between two, thin panels of manufactured, exterior-grade fiberglass reinforced cement board. Particles and proteins from the core mix penetrate, migrate into and fill interstitial spaces in the cement board, forming a strong, continuous and homogenous bond between the fill material and the board itself. This imparts additional strength to the cement board by filling the interstitial voids, creating a solid, homogeneous wall. The wall, girder, etc. structure is fabricated at the building site to form seamless, monolithic wall units according to the lost-form system of casting by erecting, assembling and appropriately connecting the fiber cement boards. An outer cement board is used as a permanent form creating one side of the building wall. The fiber-foam-cement core supplies structural strength, insulating properties and monolithic bonding of all components. An inner, cement board creates the interior side of the wall.

68 Claims, 14 Drawing Sheets

U.S. PATENT DOCUMENTS

| | | | |
|---|---|---|---|
| 1,963,980 | 6/1934 | Garrett | 52/169.1 |
| 1,976,595 | 10/1934 | Asleson et al. | 52/698 |
| 2,068,831 | 1/1937 | Washburn et al. | 52/169.1 |
| 2,222,339 | 11/1940 | Schenk | 249/214 |
| 2,234,797 | 3/1941 | Burner | 52/251 |
| 2,412,307 | 12/1946 | Tatsch | 52/99 |
| 2,899,735 | 8/1959 | Graef | 249/46 |
| 3,734,453 | 5/1973 | Bailey | 249/213 |
| 3,758,319 | 9/1973 | Ergene | 264/42 |
| 3,889,436 | 6/1975 | Elliott | 52/514 |
| 3,979,217 | 9/1976 | Sutton | 106/88 |
| 4,006,878 | 2/1977 | Dawson et al. | 249/213 |
| 4,450,128 | 5/1984 | Takeuchi | 264/70 |

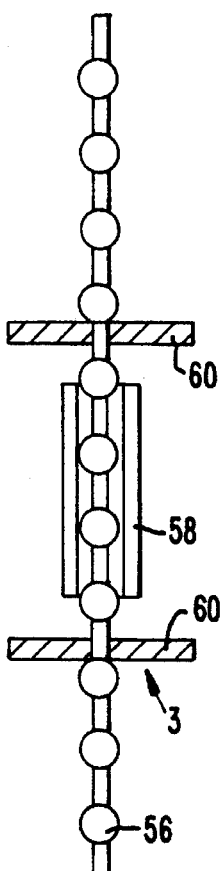
FIG. 14.
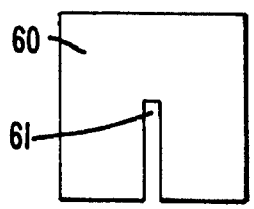
FIG. 15A.
FIG. 15B.
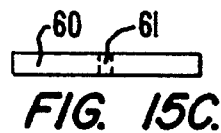
FIG. 15C.
FIG. 13.
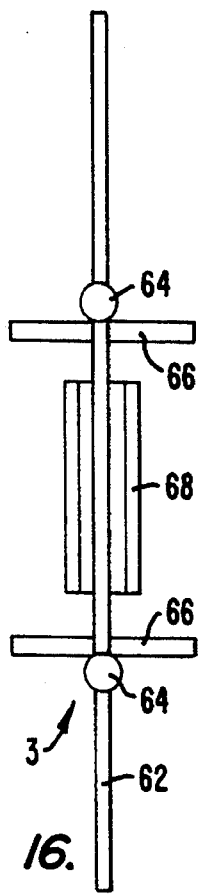
FIG. 17.
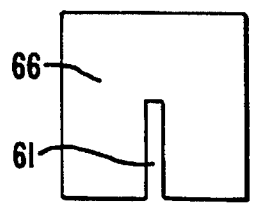
FIG. 18A.
FIG. 18B.
FIG. 16.
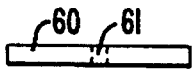
FIG. 18C.

BUILDING WALL AND METHOD OF CONSTRUCTING SAME

RELATED APPLICATIONS

This application is a continuation-in-part application of Ser. No. 07/890,755 filed May 28, 1992 for a Building Wall Structure And Method Of Constructing The Same, now abandoned.

BACKGROUND OF THE INVENTION

This invention relates to the construction of building structures such as walls, beams, girders and the like. Most modern construction systems fall into one of the following broad categories:

1. On-site or pre-manufactured wood and/or metal frame construction.
2. Masonry, joined or assembled at the building site and composed of various materials, including stone, brick, and precast concrete-masonry building units.
3. Manufactured or precast concrete panels.
4. Cast-in-situ concrete structural walls (including composite concrete and insulation material "sandwich" structures and lost-form systems).
5. Tilt-up, cast-on-site concrete walls.

Such systems require mechanical or chemical (bonding) attachment of, or include as components within themselves, environmentally unsafe, if not hazardous, wind and/or vapor barriers, waterproofing and various thermal and acoustic insulation. For example, they generally rely upon pre-manufactured batts or panels for insulation and wind and weatherproofing. Such batts or panels are composed of some or all of: plastic sheeting, kraft paper, aluminum foil, fiberglass, rock wool, petroleum tars, expanded plastics and the like. They require skilled, experienced labor and specialized tools for their construction. They are therefore costly and time consuming to complete. Teaching the skills required to construct these systems is an expensive process, often requiring years of education, formal training and hands-on experience.

Furthermore, many aspects of these systems are environmentally unfriendly; some are even toxic. Wood-based systems require the cutting of large tracts of forest, which is environmentally harmful, and wood is often treated with toxic chemicals to retard combustion, reduce decay or protect against insect infestations. Autoclaved concrete and metal-based systems require large quantities of thermal energy for their manufacture and fabrication. Most commonly used systems further require at least some environmentally harmful, often toxic, moisture and vapor proofing and insulation.

The safety and durability of these systems are also less than ideal. Wood systems are subject to destruction or damage by insects, rot, fire and catastrophic events such as tornadoes, hurricanes and floods. Metal-based, concrete and masonry systems frequently fail at inter-component connecting points during earthquakes or because of soil movement. Complex; e.g. framed systems and most of the composite concrete sandwich, systems are subject to substantial variations in assembly quality and can lead to catastrophic failure if carelessly or incompetently assembled, and they require substantial amounts of costly repair and maintenance.

In addition, all systems, except wood framing, are at best difficult to modify or add onto, requiring considerable skill and specialized tools, making building modifications and additions costly.

Concrete systems must either be permanently encased in, sheathed by, or include internally, air spaces and/or one or more insulation layers such as rigid, expanded plastic foam to reduce thermal or heat transmission through them. However, air spaces and insulating materials reduce the structural integrity of the system, since they vary the compressive and shear strengths across a given section. Moreover, plastics are not porous and consequently do not naturally adhere to or bond intimately with poured concrete. As a consequence, such systems tend to delaminate unless they are permanently secured with mechanical fasteners or adhesives.

An important characteristic of a construction system is the consistency and predictability of its structural qualities. Predictability results from uniformity through any given section of any structural wall constructed under prescribed conditions on any site and at any temperature or humidity. It increases as homogeneity and uniformity throughout the structure are improved. Wood- and steel-framed systems, for example, lack such predictability because their complexities create opportunities for variation in materials, construction quality and workmanship. Concrete systems lack this uniformity and predictability because the strengths, the porosity (affecting bonding within the mixture) and the shapes and sizes of the natural aggregates used in their preparation vary widely from source to source and from one location to another. Completed concrete pours which fail to meet desired strengths must be broken or sawed, removed and replaced, all of which is time consuming and costly.

Further, commonly-employed construction systems eventually exhibit the self-destructive effects resulting from the varying coefficients of thermal and moisture expansion of the differing materials and components employed by them. Ideally, a building wall system should have a uniform coefficient of expansion throughout so that the entire system expands and contracts alike.

Similarly, concrete and concrete/plastic sandwich systems generally cannot be produced at temperatures substantially below the freezing point of water. Very low humidity is also detrimental to the production of consistent, high-quality, cast concrete and to mortar used to bond masonry systems. Ideally, however, building wall systems should be producible regardless of the prevailing temperature or humidity.

Lastly, an increasingly important characteristic of a building wall system is its ability to uniformly "store" thermal energy. This is generally referred to as the wall's thermal mass. Systems that sandwich concrete between layers of rigid plastic foam fail to provide thermal mass because the sides of the sandwich isolate the concrete core, thereby preventing acquisition of heat or cooling from the interior of the structure. Wood-framed structures have a low level of thermal storage capability and, due to their complexities, must be sealed and insulated to prevent thermal loss due to air transfer. Metal-framed structures are insulated on their interior surfaces and consequently have little or no thermal mass. Most concrete and masonry structures are also insulated on their inner surfaces, again, isolating the mass of the wall from thermal input from the interior of the structure. Relatively better thermal mass systems are cast concrete and/or fully-grouted masonry walls, insulated only on their exterior sides. Ideally, a building wall system should provide both low rates of thermal (and acoustic) transmission while simultaneously storing the heat or cooling from within the building. Preferably, such a system does not require the separate application or inclusion of insulation material.

Present construction and building trades practices and literature and current information and literature available from manufacturers and suppliers recommend that fiberglass reinforced cement board panels or plates be used only as sheathing or veneer cladding for frame structures. Practice and literature also specify that, over this sheathing or veneer cladding, various finishes must be applied. In practice and literature, the fiberglass reinforced cement boards are mechanically fastened to wood or metal framing members or to sheathing, decking or sub-flooring that is attached thereto. Once so attached, in both literature and practice, the fiberglass reinforced cement boards act as underlayment for finishes such as tile, elastomeric/foam systems and specialty veneer plasters. Because fiberglass reinforced cement boards are porous and allow ready infiltration of water, they are ordinarily not painted. Since fiberglass reinforced cement boards are also relatively brittle when subjected to point loads and tend to shatter around impact or screw-type penetrations, they are customarily not veneered or further clad with wood or other types of sheet or strip siding materials. Mechanical fasteners simply do not hold well when inserted into such boards without other backing.

SUMMARY OF THE INVENTION

To overcome these problems and enhance the overall quality of building walls or components, the present invention bonds two or more sheets of fiberglass reinforced cement board (hereinafter frequently simply "cement board") to a thick, insulating, structural core of fiber-foam cement material, which fills the pores of and thus adheres to the cement board and thereby creates a uniform building structure. The resulting structure; e.g. a wall, has greater flexural and compressive strengths and is less brittle than the fiberglass reinforced cement boards or the core alone. After pouring, the core materials fill the porous interstices characteristic of fiberglass reinforced cement board, thereby closing the surface pores, "gluing" together the small aggregates of the boards, and making the boards highly resistant to cracking and shattering around impact and screw-type penetrations.

The insulating characteristics of such a wall are so high that no further insulating material is required. The outer surfaces of the wall readily accept paints and are highly resistant to air and water infiltration. As a result, they need not be veneered or clad with gypsum board or other materials to permit finishing. In combination with the underlying fiber-foam cement core the cement boards accept and hold nails and screws far better than unbonded fiberglass reinforced cement board. Being uniform, solid and without insulating voids or air spaces, a wall constructed in accordance with the invention further provides consistent, predictable structural strengths across any section. Because the cement core does not use gravel or large aggregates, the core material is easily shaped, reshaped and fabricated with simple hand tools, such as saws, knives, routers and chisels.

It is thus an objective of the invention to provide a complete, simple, sturdy, building construction that allows a cost-effective, on-site fabrication of most types of buildings and of their structural and architectural components.

A second objective of the invention is to facilitate construction by individuals having relatively few specialized skills or tools.

A third objective is to use materials that reduce environmental impact and energy requirements during manufacturing and construction.

A fourth objective is to provide building structures which are highly water-, fire- and wind-resistant, monolithic and seamless, to lessen the probability of earthquake damage due to failure of connections between building components.

A fifth objective is to provide a building construction that can easily be modified with simple hand tools after completion and that readily accepts commonly-used fasteners such as nails and screws.

A sixth objective is a reduction in maintenance and repair costs.

A seventh objective is to provide a system that is visually, acoustically and architecturally indistinguishable from buildings made of other, common construction systems and materials.

An eighth objective is to provide a building construction having a large thermal mass and low thermal and acoustic transfer characteristics without the need for separate, often incompatible, insulating materials.

A ninth objective is to provide a system that is impervious to rot and to insect and vermin infestation without the need for toxic or hazardous chemicals.

A tenth objective is to provide a homogeneous, uniform system with high levels of structural predictability.

An eleventh objective is to provide a building construction having a constant, homogeneous and predictable coefficient of thermal expansion through any given building wall section.

A twelfth objective, as an alternative to the complete on-site construction of a building in accordance with the present invention, is to facilitate the off-site manufacture or preparation of structural panels, beams and the like for later final assembly at the construction site.

A thirteenth objective of the invention is to permit construction regardless of temperature or humidity.

A further objective is to provide sufficient architectural and design flexibility to accommodate any architectural style or mode.

Formed and cast in-situ, the invention provides a building structure whose walls are uniform and monolithic, typically comprising only two, basic elements with nearly identical physical characteristics and coefficients of expansion. Alternatively, if pre-manufactured off-site for later fabrication or assembly, the invention provides lightweight, strong building elements which can be designed and fabricated to suit virtually any architectural or structural need.

Instead of relying on mechanical or adhesive attachment of reinforcing or connecting components for developing the strength of the structure, the present invention generates a bond resulting from the migration of the core materials, in their flowable state, into the open pores and interstices which are present in all commonly available cement boards. The pores in the cement boards become filled with particulates and stabilized proteins suspended in the core material, which strengthens and stiffens the boards and creates a strong, homogenous bond between them and the core. The result is a structurally uniform, composite building wall or other structure. Conventional lost-form systems do not create such a homogeneous bond between the form material and the poured core material. Thus, they must rely on mechanical fasteners to hold the components together, even after the fill material has reached maximum strength.

Another feature of the invention is that it enables the construction of building walls and structures by individuals possessing relatively few building skills and without the need for specialized tools. For example, the invention provides simple "bead on a string" or "knotted string" form ties that are used to erect in-situ wall forms made from commercially available fiberglass reinforced cement boards. The simple ties hold the cement boards in place so that they constitute a form for the core materials before and during pouring. The ties are cut off just below the wall surface after the core has cured, leaving the wall ready for paint or other finish.

A further feature of the invention is its environmental benevolence. The core is preferably made of a fibrous foam composed of 2.5 denier, 0.83"-cut, DuPont P732 nylon fiber (Nylon Polyamide fiber), Neopor brand stabilized hydrolyzed protein as a foaming agent, water, and an appropriate mixture of cement and/or smoke stack fly-ash, clay and/or fine sand. The precise formulation of the mix depends upon the strength required to withstand the design loads.

The nylon material in the core material mix in the form of short fibers is composed of carbon, hydrogen, nitrogen and oxygen and poses no known physical, health or environmental hazard, even during decomposition. The other materials used in the core mix are naturally occurring, non-toxic and harmless. Although the composition of fiberglass reinforced cement boards varies to some extent from manufacturer to manufacturer, they too are essentially environmentally benign. The plastic ties and spacers used for the cast-in-situ applications are also made of nylon or, as an alternative to adapt the invention to readily available materials in developing countries, for example, the ties can be made of string employing spacers made of wood, reed, bamboo or similar naturally available materials.

Walls and structures made in accordance with the present invention are extremely tough and durable. They will not burn at normal combustion temperatures. They are also highly resistant to air and water infiltration since their pores are closed, offering no migration pathways. In typical, above-grade applications, they do not normally require waterproofing. In cast-in-situ applications, all the walls of a building made in accordance with the invention are uniform and seamless. Even without being fixed to a foundation footing, such a building wall, essentially a single, tough, solid block of a cement board sheath-foamed cement core, supplies enough inertia to resist movement caused by earth shifting, high winds and moderate seismic events. Properly fixed to a suitable foundation, it is effectively immobile, even in strong earthquakes.

The density and texture of a wall or structure made in accordance with the invention closely resemble those of solid wood. Except for unusually high loading, the walls do not require steel rod or mesh reinforcements, nor do they require special tie downs, clips or clamps for positioning. They can, as a result, be fabricated or modified with basic hand tools—saws, hammers, chisels, and the like—making it easy to change or enlarge the structure after completion. Further, conventional building systems are easily joined to walls and structures made according to the invention and vice versa, and they are readily patched and repaired without special tools, skills or equipment. The walls and structures of the present invention accept common fasteners, such as nails and screws, for attaching finishes, moldings, shelving, pictures and decorations.

Walls and structures made according to the invention are durable and have a longevity equivalent to that of cast-in-situ concrete, but are less subject to cracking than concrete. It is anticipated that in normal service, walls and other structures made according to the invention will have a life span of at least one hundred years.

Because they can be finished with common materials, buildings made according to the invention need not be visually or otherwise distinguishable from buildings constructed using conventional construction systems, including wood framing. When struck, the walls produce a sound much like that of a wood-framed wall. The low rate of thermal transmission makes the walls feel warm in cold climates and cool in warm climates, much like a heavily insulated wood-framed wall.

When cured, the fiber-foam cement materials of the core of a wall, beam, girder, panel or other structure form a rigid, lightweight closed cell foam-cement composite made of fibrous and particulate materials encasing but not penetrating air-filled voids generated by the foam component of the core. The voids in the core inhibit thermal and acoustical energy transmissions. The fiber/particulate lattice surrounding them stores thermal (heat) energy. The result is a structure that has excellent insulating and thermal mass characteristics.

The materials of walls and structures made in accordance with the invention are impervious to rot, insect predation and mildew without requiring treatment with or the inclusion of toxic chemicals.

The present invention further provides a high degree of predictability. The walls are made of stable, small-particle-sized, earth-based materials, cements, clays or fly ashes and stabilized, hydrolyzed, protein-based foam. The resulting uniformity and consistency of the coefficient of thermal expansion throughout a structural system increases its long-term durability. They are therefore less likely to crack or break apart than complex systems employing materials and components with differing rates of thermal expansions and contractions because they expand and contract uniformly.

Not only can the present invention be used to produce a monolithic, cast-in-situ structure, but it can also be crafted in off-site settings. This permits the custom fabrication or even the manufacture of prefabricated structural shapes, panels, beams and girders for incorporation into other building systems or for assembly into structures fabricated entirely in accordance with the present invention.

BRIEF DESCRIPTION OF THE DRAWINGS

FIG. 13 is an enlarged view in section of a wall board tie assembly shown installed in FIGS. 11 and 12;

FIG. 14 is an end view of the slotted, plastic spacer shown in FIG. 13;

FIGS. 15A–C are front, side elevational and plan views of the slotted, plastic tie plates shown in FIG. 13;

FIG. 16 is a sectional view similar to FIG. 13 of a tie assembly fabricated from knotted hemp twine, slotted bamboo or tough reed and wood;

FIG. 17 is an end view of the slotted, bamboo or reed spacer shown in FIG. 16;

FIGS. 18A–C are front, side elevational and plan views of the slotted, wooden tie plate shown in FIG. 16;

DETAILED DESCRIPTION OF THE PREFERRED EMBODIMENTS

Figure 1:
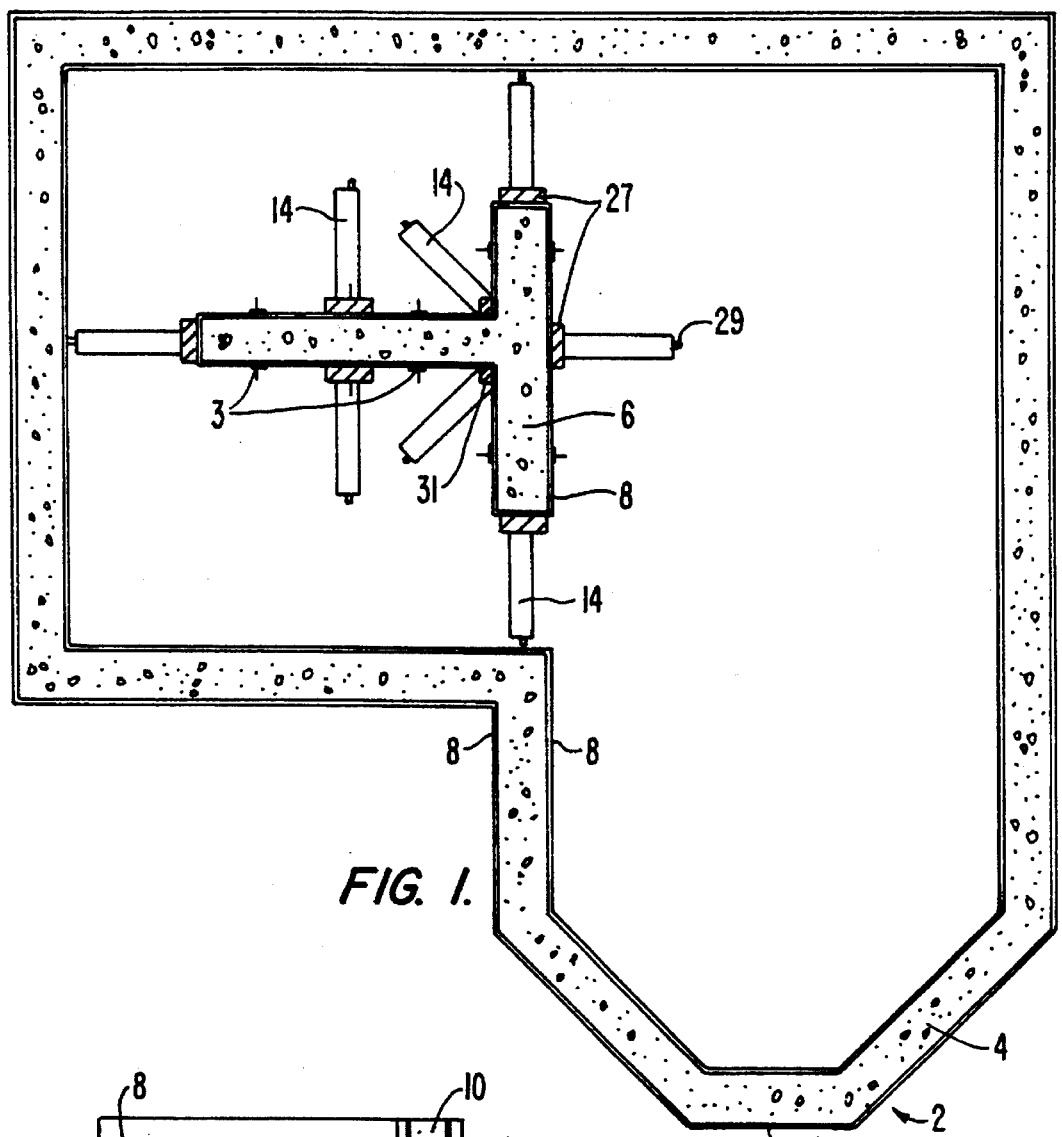
FIG. 1 is a schematic plan view of a building structure constructed in accordance with the present invention.
Figure 2:
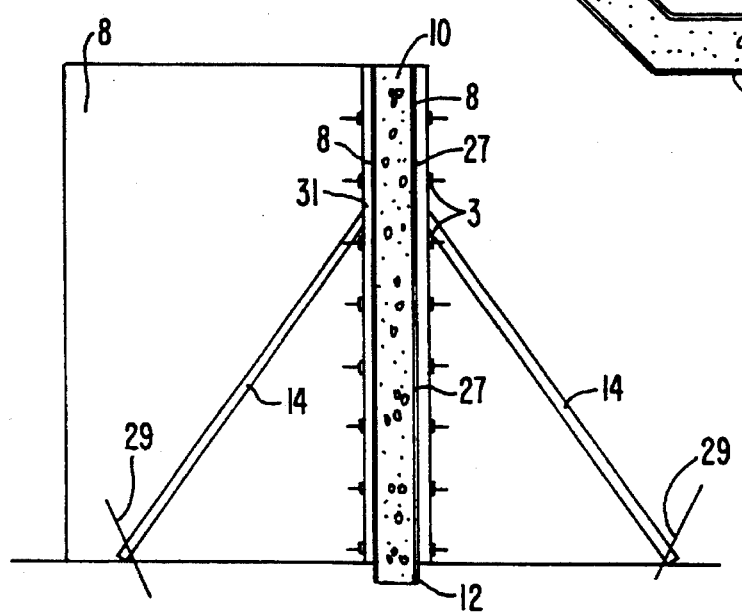
FIG. 2 illustrates the manner in which the fiberglass reinforced cement boards can be temporarily tied together and braced for alignment and support prior to and during the pouring of the fiber-foam cement core.

Referring to FIGS. 1 and 2, a building structure 2 has multiple exterior and interior walls 4, 6, which can be created by one or two workmen without special tools or skills by erecting panels of fiberglass reinforced cement boards 8 that become a permanent form into which fibrous, foam cement fill is poured to form a core 10. The lightweight cement boards require no heavy lifting equipment such as cranes or hoists to set them in place. The lower ends of cement boards 8 are inside a continuous slot or channel 12 cast into foundation footings, foundation slabs or stem walls, or dug or otherwise formed into compact earth. FIGS. 1 and 2 illustrate typical knee bracing 14 for support of the wall boards until after the core has been poured and cured.

FIG. 1 shows several types of temporary bracing. Uprights 27 and 31 are spaced as required by the architecture of the structure. Generally the spacing is not less than four feet on center. In addition, an upright is placed at all panel-to-panel joints and at all inside and outside corners. The uprights are drilled at regular intervals to accept tie assemblies 3, which are more fully discussed below.

By placing the uprights over vertical panel joints, the need for special leakage prevention devices, caulking, sealing or closures where forms abut one another is eliminated. The knee braces 14 support and lock the uprights in place, and when made of wood, they may be nailed, screwed or hinged to the uprights. The bottom ends of the knee braces are held in place and secured in any convenient manner such as with concrete form pins 29 driven into the earth. Alternatively, the knee braces may be nailed, screwed or otherwise held to wooden or concrete floors or slabs with commercially available "kickers" or even with hinges (not shown). Once the fiber-foam cement core material has cured, the bracing is removed and the structural walls are ready for finishing.

Figure 3:
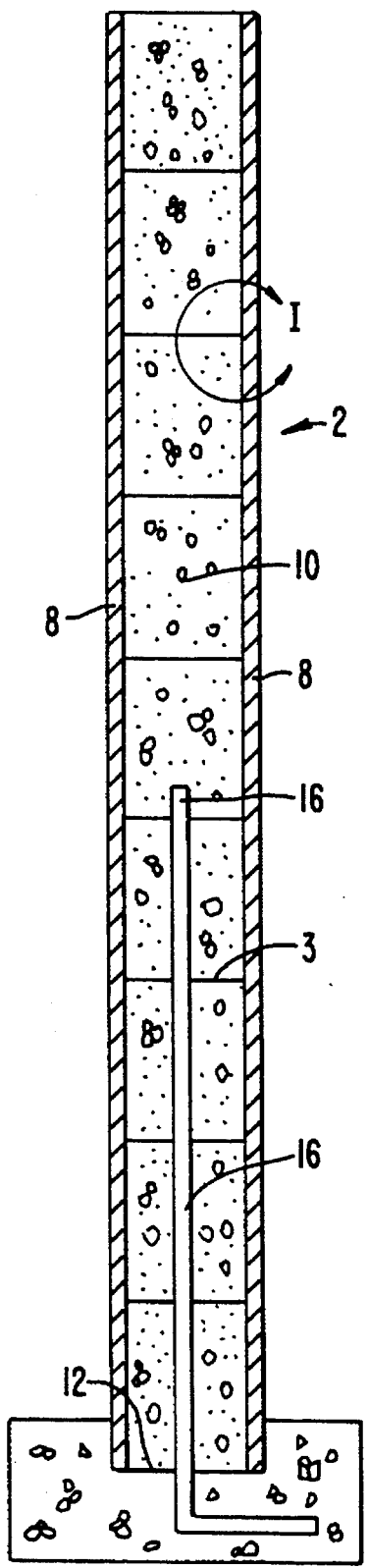
FIG. 3 is a section through a finished first-story wall constructed according to the present invention and shows a concrete foundation footing.

FIG. 2 shows a transverse section through a completed, single-story wall 1 constructed according to the invention and made of two fiberglass reinforced cement boards 8 permanently bonded to a core 10. The boards are initially held together with wall tie assemblies 3 which work in concert with and complement the knee bracing. After the core has cured, the ties are clipped off below the wall surface, plastered over and the wall is ready to be primed for paint or other finish. The wall is permanently located in continuous channel 12 of a foundation and is preferably additionally secured to the foundation with vertical reinforcing rods 16 (shown in FIG. 3), typically spaced not less than sixteen inches on center. During pouring of the core, the hydrostatic pressure of the uncured fiber-foam cement materials biases the cement boards against the sides of the slot 12, thereby preventing leakage and firmly positioning the foot of the wall. The heretofore common need for a leakage prevention sealing band or the like is thereby eliminated.

Figure 4:
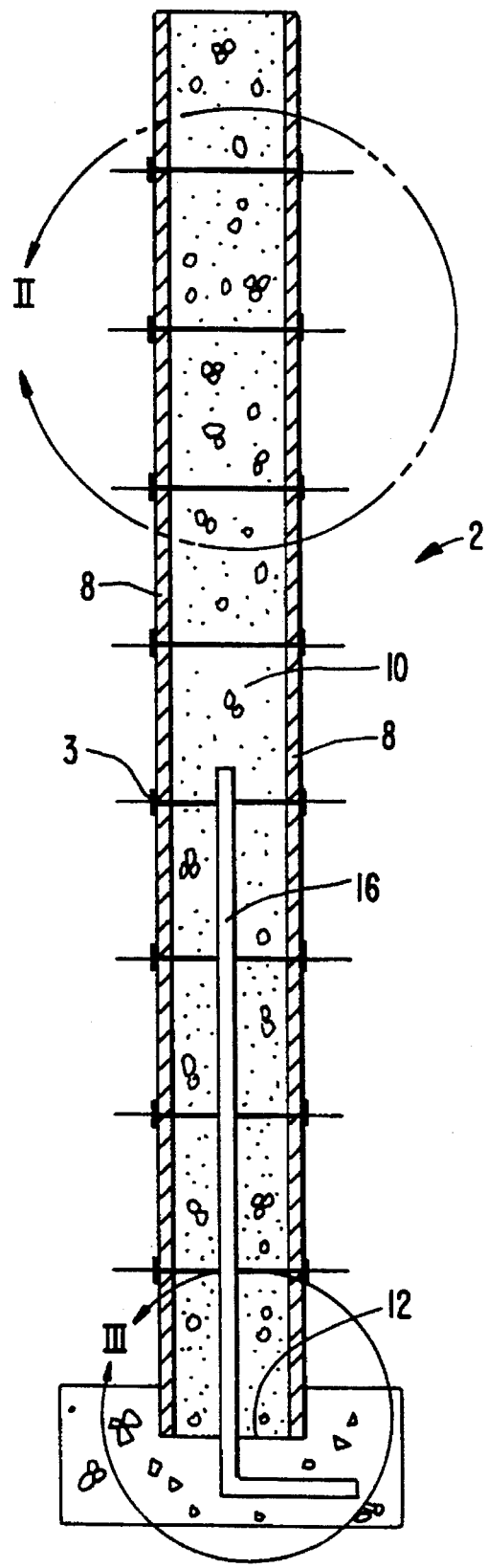
FIG. 4 is a section through a first-story building wall constructed according to the invention and before removal of visible parts of form ties and temporary braces which stabilize the system prior to and during the placement of the core materials.

A completed wall 18 constructed in accordance with the present invention is shown in FIG. 4, where tie assemblies 3 are shown before their protruding ends are cut off.

Figure 5:
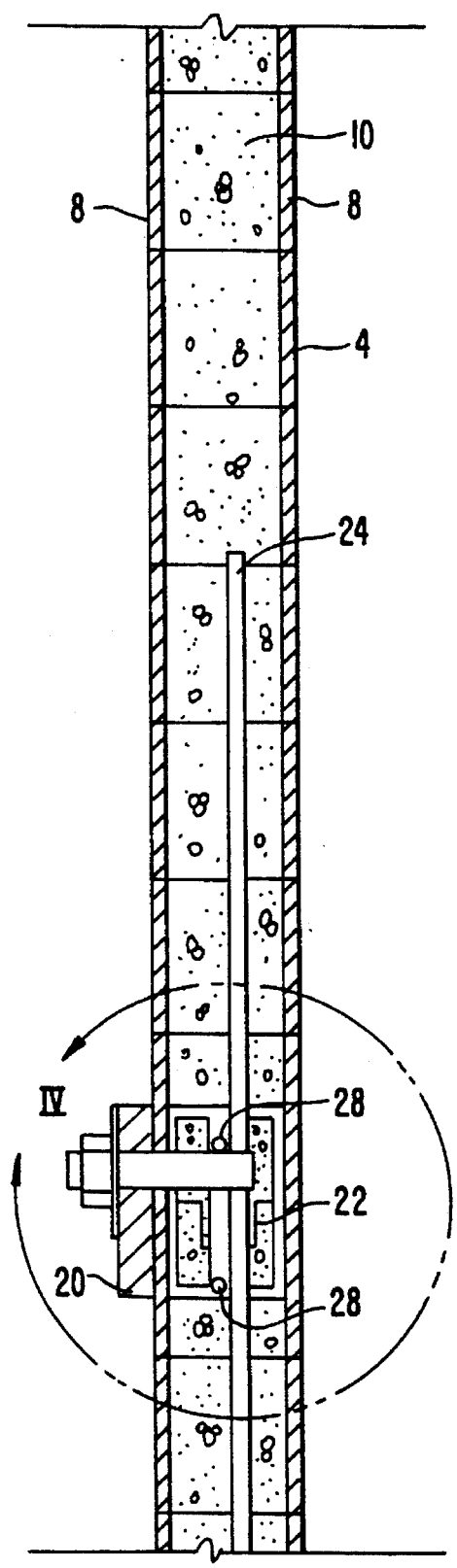
FIG. 5 is a fragmentary section illustrating the connection between exterior first-story and second-story walls and also illustrates the attachment of a ledger board or rim joist to the inner side of such a wall.

Referring to FIGS. 5–10C, to attach floors to the walls, the present invention positions horizontal ledger boards or rim joists 20 around the peripheries of interior, load-bearing walls. For first floors, this will usually occur about two feet above grade level. For higher floors, ledger boards are attached at floor-to-floor intersections, generally the weakest points of structural walls. FIG. 5 shows the means by which this is accomplished on an exterior wall 4, using hardware placed between the fiberglass reinforced cement board before the wall is filled.

For upper stories, a continuous slot 22 is cast into the top of each wall, except for the highest. This slot functions analogous to the continuous channel (not shown in FIGS. 5–10C) at the foot of the first-story wall. To provide added security for the story-to-story wall connection, eight-foot-long steel reinforcing rods 24, typically sixteen inches on center, are thrust four feet, downward, into the mass of the fiber-foam cement fill of the lower wall before it has cured, to form vertical dowels to securely connect the upper and lower walls.

Figure 6:
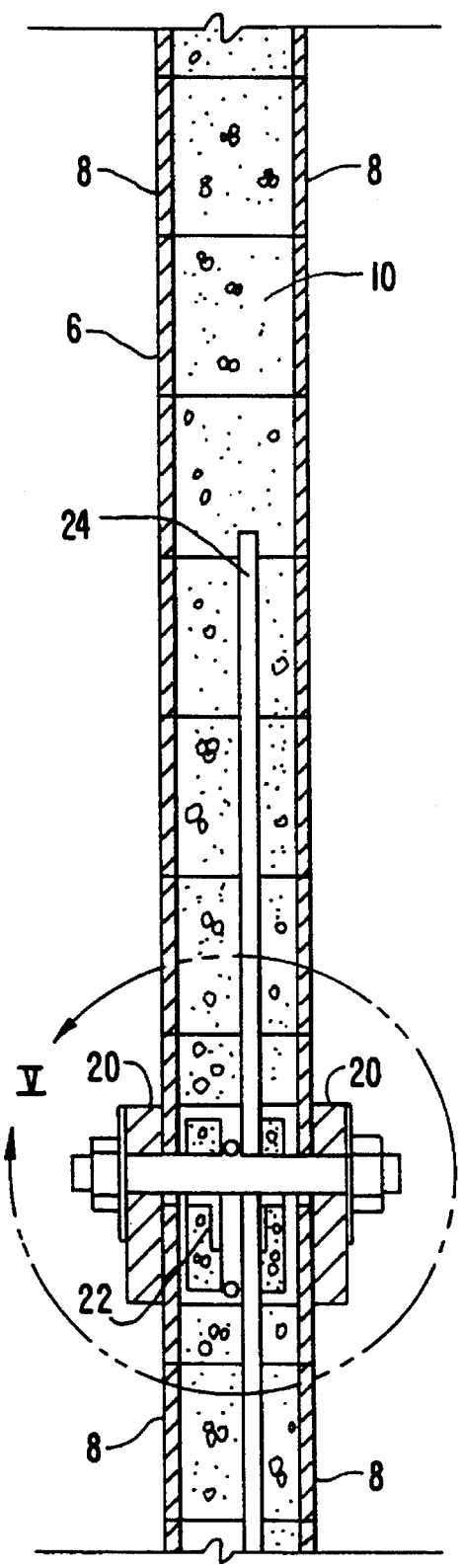
FIG. 6 is a fragmentary section similar to FIG. 5 but through interior first-story and second-story walls and illustrates a ledger board or rim joist on both sides of a wall.

Floors between interior building walls 6, shown in FIG. 6, require horizontal ledgers or rim joists 20 which are placed on both sides of the wall.

Figure 7:
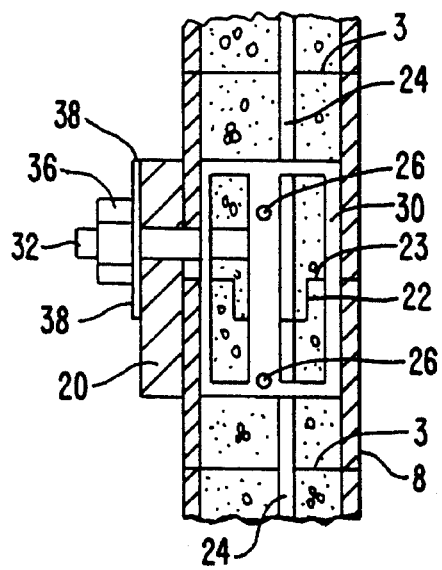
FIG. 7 is an enlarged view of the area encircled by line "IV" in FIG. 5.

As is best seen in FIG. 7 close to the lower end, a tie assembly 3 is placed immediately above and below the connection or joinder line 23 between the upper and lower walls. The vertical dowels 24 stabilize the connection. Longitudinal reinforcing rods 26, one close to the top of the lower wall, just below the continuous slot 22, and another close to the lower end of the upper wall just above the slot, reinforce and form a continuous bond beam or seismic ring. The rods 26 preferably extend over the full length of the opposing ends of the upper and lower walls and are tied together with steel tie wire with minimum overlaps of twenty-four inches and tie lengths of not less than twelve inches. Plastic connecting saddle plates 30 are secured to the fiberglass reinforced cement board forms of the lower walls with rust-proofed, self-threading screws (not shown) having flattened, bugle-type heads, not less than ⅜" in diameter, and adapted for use on fiberglass reinforced cement boards for attachment to wood or metal framing. The saddle plates include holes 28 through which the longitudinal rods 26 are inserted.

After all saddle plates 30 have been placed, holes are drilled through the faces of the cement boards to accommodate the threaded bolts 32 which extend through and project from corresponding transverse holes 34 (see FIG. 9C) in the saddle plates. The threaded bolts 32 protrude outward from the wall a distance equivalent to the combined thickness of the hex nut 36, flat washer 38, the ledger or rim joist 20, and any optional lock washer (not illustrated) which might be used. To minimize thermal transfer through the system, the inner end of threaded bolts 32 should be as far from the outer wall skin as possible. The saddle plate 30 includes two rectangular openings 40 which, after pouring, are completely filled with core materials to provide a good bond of the saddle plate to the wall system.

Figure 9A:
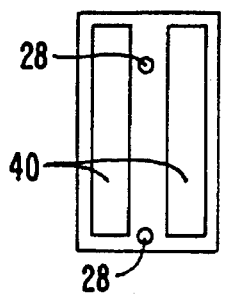
FIGS. 9A–C are front, side and top elevational views of a plastic saddle plate shown in FIGS. 7 and 8.
Figure 9B:
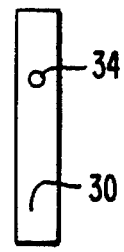
Figure 9C:
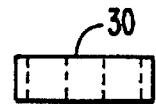
Figure 10A:
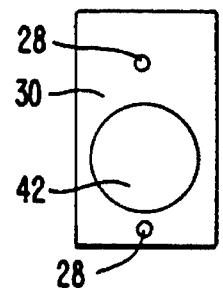
FIGS. 10A–C are views similar to FIGS. 9A–C showing a saddle plate constructed of wood.
Figure 10B:
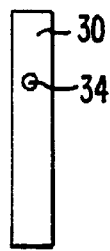
Figure 10C:
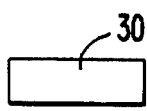
Figure 12:
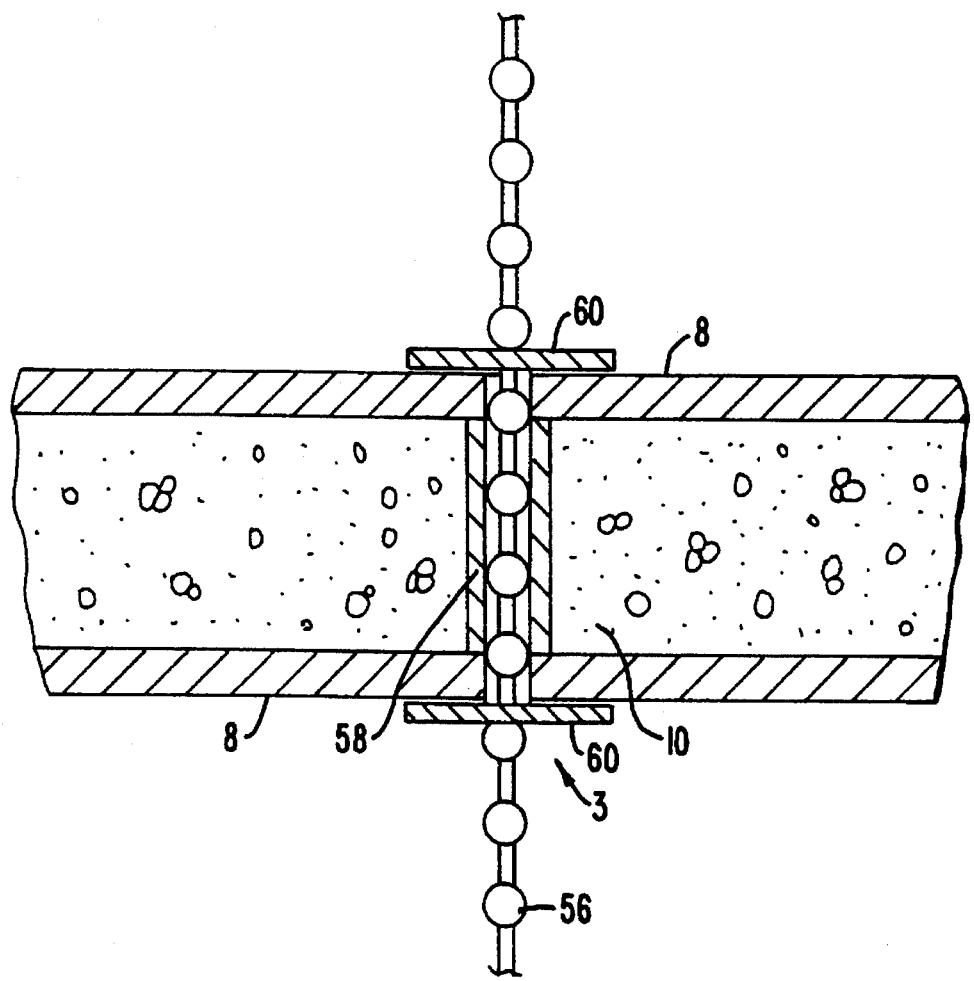
FIG. 12 is an enlarged view of the area encircled by line "VI" in FIG. 11.

Saddle plates 30 can be fabricated of wood as shown in FIG. 10. To prevent wood cracking or splitting and to provide sufficient strength, the two rectangular openings 40 (shown in FIGS. 9A–C) are replaced by a single, circular bore 42 as is shown in FIGS. 10A–C.

Figure 8:
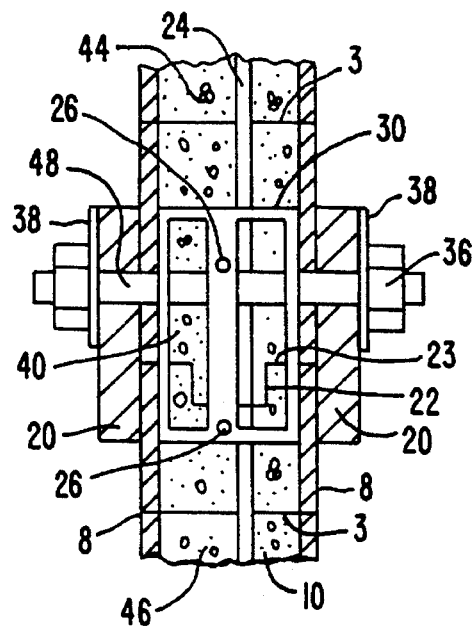
FIG. 8 is an enlarged view of the area encircled by line "V" in FIG. 6.

FIG. 8 illustrates a connection between upper and lower sections 44, 46 of an interior wall 6. A ledger or rim joist 20 is positioned on both sides of the completed wall. In this instance a threaded steel bolt 48 extends completely through the wall, permitting the attachment of a second hex nut 32, a second flat washer 38, and a second ledger or rim joist 20. The bond-beam reinforcement rods 26 are as shown in FIG. 7, as are the saddle plates 30 and the cutouts 40 filled with core mix after pouring.

Minimizing thermal transfer across the building walls is an important feature of the present invention. For this reason, the tie and positioning components for the wall system are made of materials which do not readily store or transmit thermal energy. Thus, the saddle plate 30 shown in FIGS. 9A–C is fabricated from plastic, and the one shown in FIGS. 10 is made of wood. Both materials have a low rate of thermal transfer.

Before the fiber-foam cement core materials can be poured, the cement boards 8 must be assembled and braced in their proper positions. Wall penetrations for windows, doors and the like can be cut out of the boards prior to the fill or they can be cut after the fill has cured. It is presently preferred to cut them out of the wall after the core materials have been placed and cured. Since the wall will readily accept nails and screw-type fasteners after the core has cured, door and window frames and casings can be attached directly into the rough openings so created.

Figure 30:
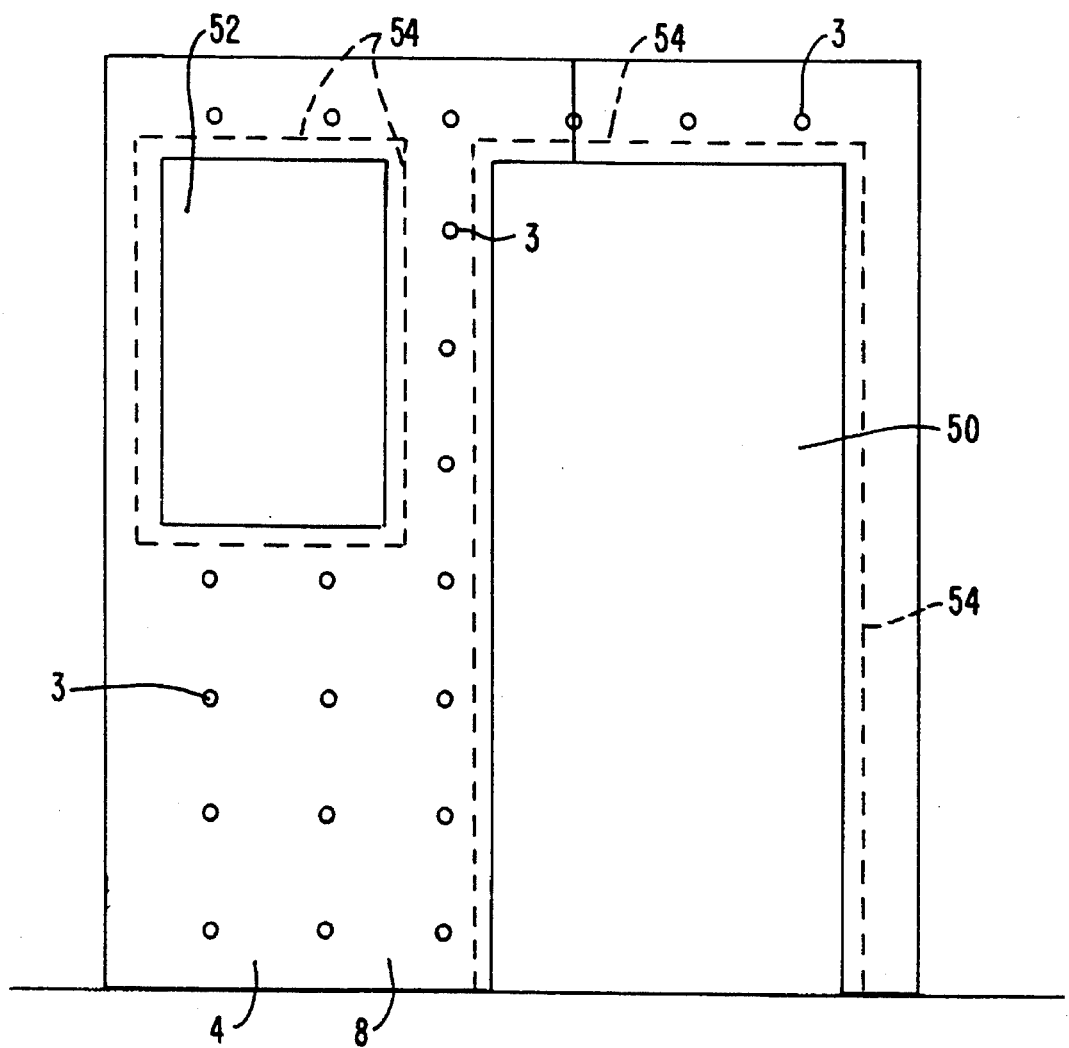
FIG. 30 is a front elevational view of an alternative manner of creating wall penetrations for doors, windows and other openings prior to the placement of fiber-foam cement core materials.

Alternatively, and as shown in FIG. 30, rough door and window openings 50, 52 are cut in the fiberglass reinforced cement board panels 8 after their erection. This can be done with a scoring knife. The openings are then "box-framed" with solid wood or metal framing materials 54 along their inside edges, as shown by the broken lines in FIG. 30. The framing materials are placed so that they are completely inside cement boards 8 with their outer edges flush with the edges of the opening. If headers (not separately shown) for doors and windows are required, they are secured in place above the openings before placement of the box framing. The box frames (and headers, if used) are secured to the cement boards with screws (not shown) adapted for attaching cement boards to framing. The screws should be specially treated to prevent rusting, are at least 1¼" in length, have flattened, bugle-type heads no less than ⅜" in diameter, should be spaced no less than sixteen inches, on center, and the heads should be flush with or recessed slightly below the surface of the boards. Additional strength can be provided by treating the edges of the openings with metal or plastic drywall corner bead. Inside and outside corners are preferably also fitted with metal or plastic drywall corner bead before the temporary bracing is applied.

Figure 11:
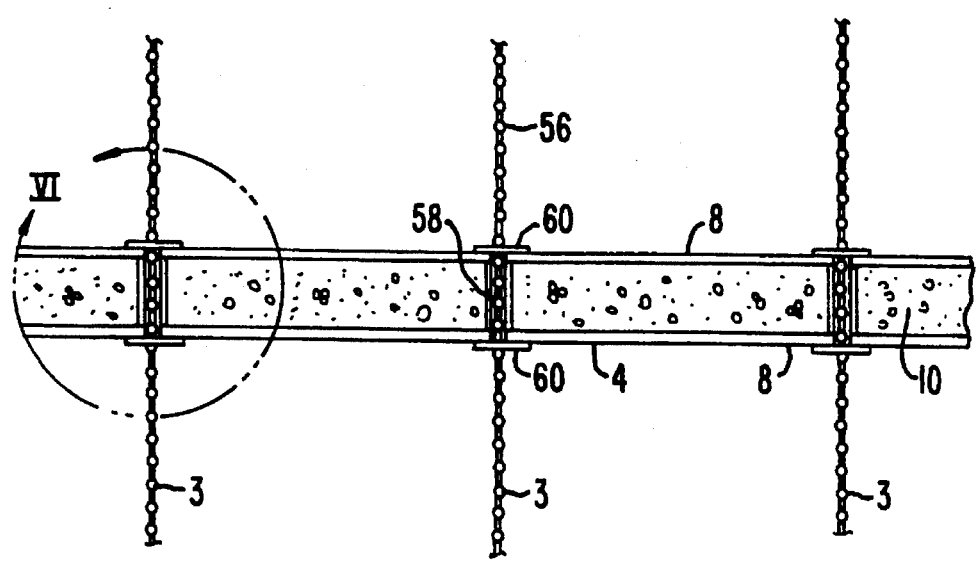
FIG. 11 is an enlarged view of the area encircled by line "II" in FIG. 4.

Referring momentarily to FIG. 11, tie assemblies 3 hold together the cement boards 8 until core 10 has cured and has become intimately bonded to the boards.

Referring now to FIGS. 12–18C, tie assembly 3 comprises a plastic "bead-on-a-string" tie 56, a slotted or trough-shaped spacer 58 placed between cement boards 8, and a tie plate 60 placed flush against the outer surfaces of the boards. The cement boards are appropriately drilled so that the ties 56 can extend through the boards. After pouring, the ties 56 and spacers 60 of tie assemblies 3 are embedded in the cured core materials.

All components of tie assemblies 3; that is, tie 56, spacers 58 and tie plates 60, are constructed of plastic in a presently preferred embodiment. Plastic is relatively inexpensive, environmentally benign, and can be readily shaped into the required forms. Since the tie 56 and spacer 58 remain in the finished wall, they have the earlier mentioned desired low thermal heat transfer characteristics. Further, as is clearly illustrated in FIGS. 15A–C, tie plate 60 includes a slot 61 which is tapered in the longitudinal direction of the slot to permit the tightening of tie 56 by pushing it along the cement board until the tie becomes taut to firmly bias the two cement boards 8 against the ends of spacer 58.

In remote locations it might be desirable to make the components of tie assembly 3 of inexpensive, readily available natural materials, such as wood, knotted twine, bamboo or a length of tough reed, to name a few. Such a system is shown in FIG. 16, which corresponds closely to FIG. 13. In this embodiment, a tie 62 is made of a length of twine, carefully knotted so that the distance between knots 64 equals the thickness of the wall plus the thickness of the wedge-shaped, slotted, wood tie plates 66. A slotted spacer 68 is fabricated from a length of bamboo or reed which equals the thickness of the desired wall, less the sum of the thicknesses of the two fiberglass reinforced cement boards. The slotted tie plates 66 are made of wood. It is wedge shaped and includes a slot 61 like tie plate 60 shown in FIGS. 15A–C.

Figure 19:
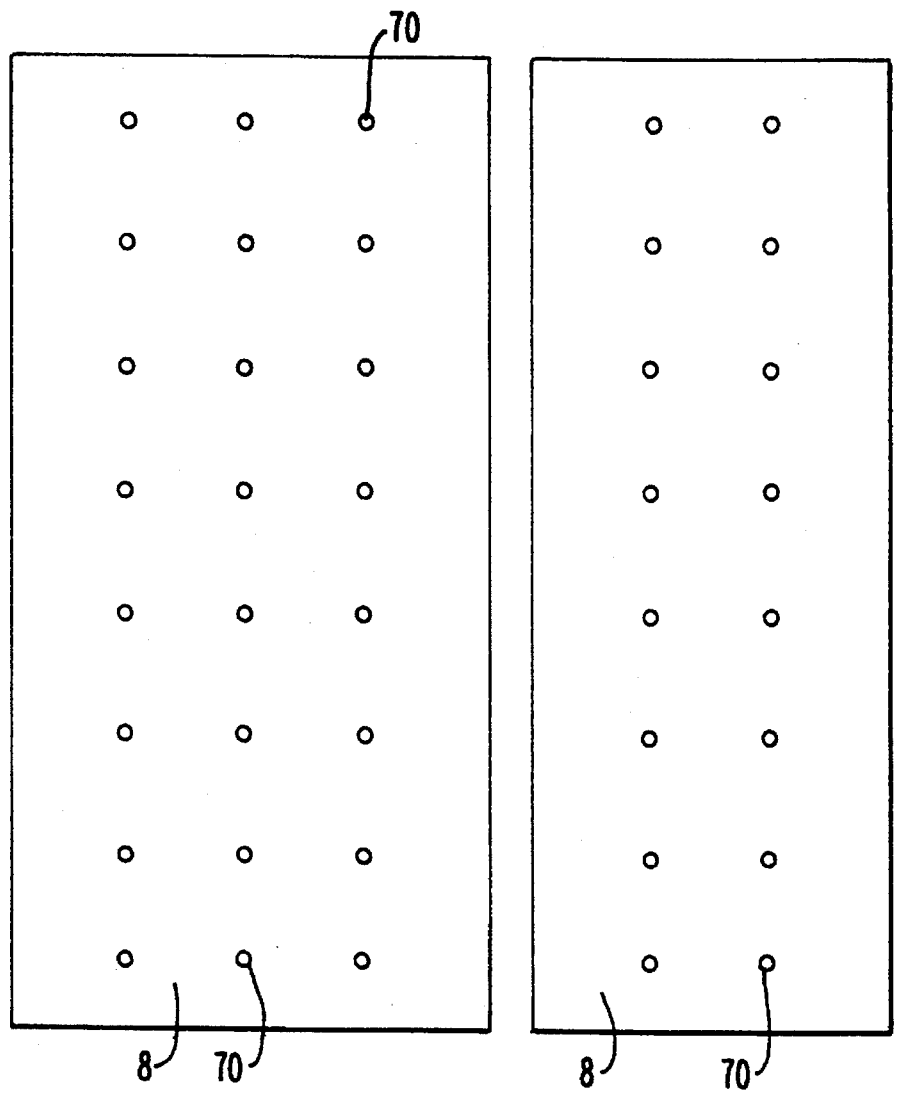
FIG. 19 illustrates the hole patterns in two differently sized, side-by-side fiberglass reinforced cement boards for receiving tie assemblies during the erection of the boards.
Figure 20:
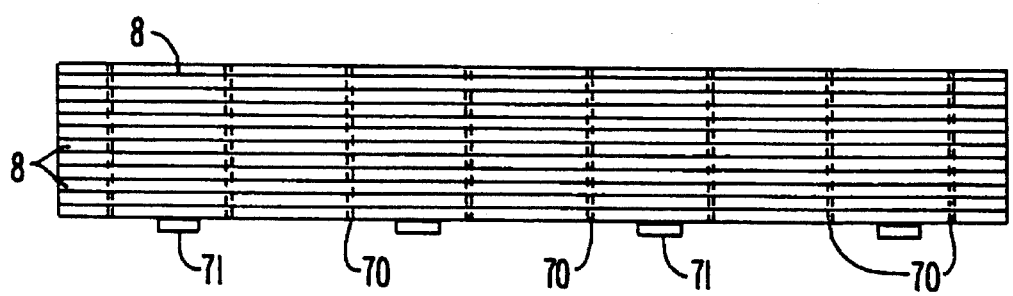
FIG. 20 shows a stack of twelve cement boards ready for shipment and storage.

Referring to FIGS. 19 and 20, the construction of an exterior or interior wall 4, 6 in accordance with the present invention begins with the location and drilling of holes 70 through cement boards 8. At present, two popular sizes (4×8 and 3×8 feet) of exterior rated, fiberglass reinforced cement boards are commercially available (FIG. 19). The boards are usually shipped in stacks, called "units", of twelve or twenty-four panels each, laid flat on supports 71. FIG. 20 shows a unit of twelve panels. While so stacked, the desired locations where tie assemblies are to be placed are marked and holes 70 are then drilled through the entire unit. Although the hole patterns may be varied, they should typically be spaced no less than twelve inches on center. For repetitive or high-volume situations, the holes may be drilled with a single pass under a multiple-bit drill (not shown) with appropriately preset drills.

Once holes 70 are drilled, boards 8 are preferably sealed by applying a single, rolled-on coat of thin, latex-based drywall sealer. Some cement boards 8 are smoother on one surface than on the other. In such instances, the sealer should be applied to the smoother surface. Sealing the boards in this manner fills the pores most proximate to what eventually will become the outer surface of the wall. Later, the poured fiber-foam cement core fill penetrates the inside surfaces (facing core 10) of the boards. Particulate and proteinaceous materials from the uncured (flowable) core fill materials migrate into the cement boards. We have observed that this migration of fill materials into the boards is enhanced when the outer surfaces of the boards were previously sealed. At the same time, the reduction in the porosity of the outer boards surfaces prevents a too rapid migration of the fill materials which, if it occurred, could cause a partial collapse of the foam cell structures of the poured, still uncured core fill.

Figure 21:
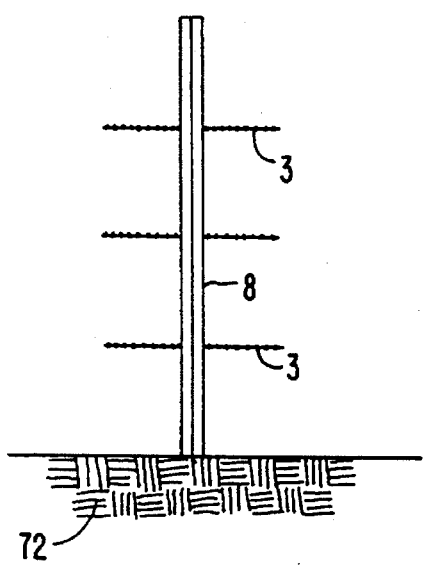
FIG. 21 is a cross-sectional elevation view illustrating the first step in the process of inserting the ties through the holes in a pair of fiberglass reinforced cement boards shown paired and standing upright on the ground, with their short sides vertically oriented.
Figure 22:
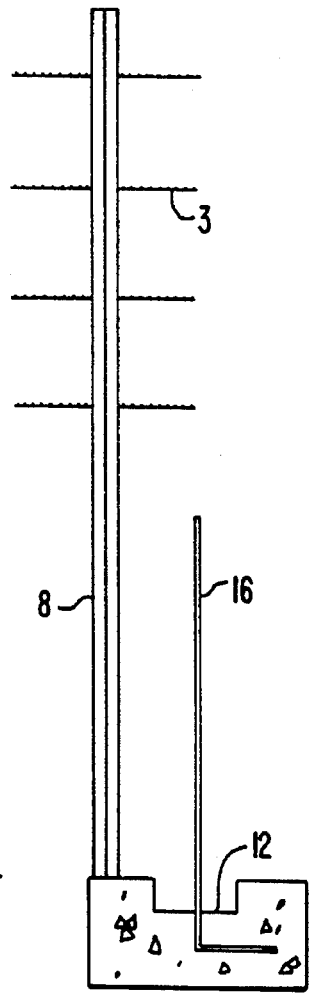
FIG. 22 is a sectional elevation view of the second step in the wall erection process with the panels moved atop a typical, continuous slotted foundation footing with the same fiberglass reinforced cement board panels illustrated in FIG. 21, now rotated 90° so that their long sides are vertical.
Figure 23:
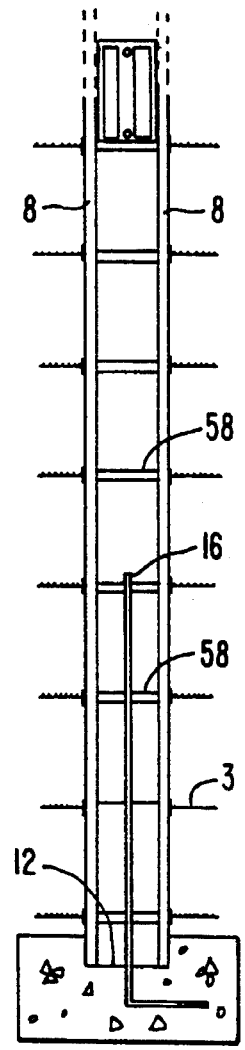
FIG. 23 is a sectional elevation of the wall-forming fiberglass reinforced cement boards with all ties and optional second-story and bond-beam and truss connecting hardware in place, but without side or corner bracing, the entire assembly being inserted into the continuous slot in the foundation footing and ready to accept placement of the fiber-foam cement core materials.

Referring to FIGS. 21–23, after the sealer has dried, cement boards 8 are paired, back to back, with their sealed surfaces on the outside, and tie holes 70 are aligned. Ties 56 (or 62) are inserted through the now-aligned holes 70 in only the upper half of the board. This is preferably done with the long sides of the cement boards horizontal on floor 72 and their short sides vertical.

Next, the cement boards 8 are rotated 90° so that their long sides are vertical as seen in FIG. 22 and placed atop the footing parallel to flow channel 12. The boards are separated slightly and set into the channel over the upwardly protruding reinforcing rods 16 so that they are located in the cavity between the boards. Ties 56 are then inserted through the remaining holes 70 in the lower portions of the boards and slotted spacers 58 are placed over these ties. Slotted tie plates 60 on the outer sides of the panels are pushed over the ties until they are taut, and the entire assembly is moved into its final position so that the vertical edges of the boards are slightly spaced from the edges of adjacent, previously set boards or wall sections to form a gap between them.

FIG. 23 shows the fully assembled boards 8, ready to be filled with the fiber-foam cement core materials. If one or more additional stories are to be placed over the first, the saddle plates 30 are screwed into position at the top of the assembly. If a single story is to be poured, the saddle plate is still positioned at the top of the boards as shown. The exposed top of the saddle is then used to form an anchor for the later attachment of structural roof system components (not shown). When saddle plates are used, one or both of the horizontal reinforcing rods 26 (best seen in FIGS. 7 and 8) are placed at this time. The broken lines at the top of FIG. 23 show where cement boards may later be placed to form the walls for the upper stories.

Figure 24:
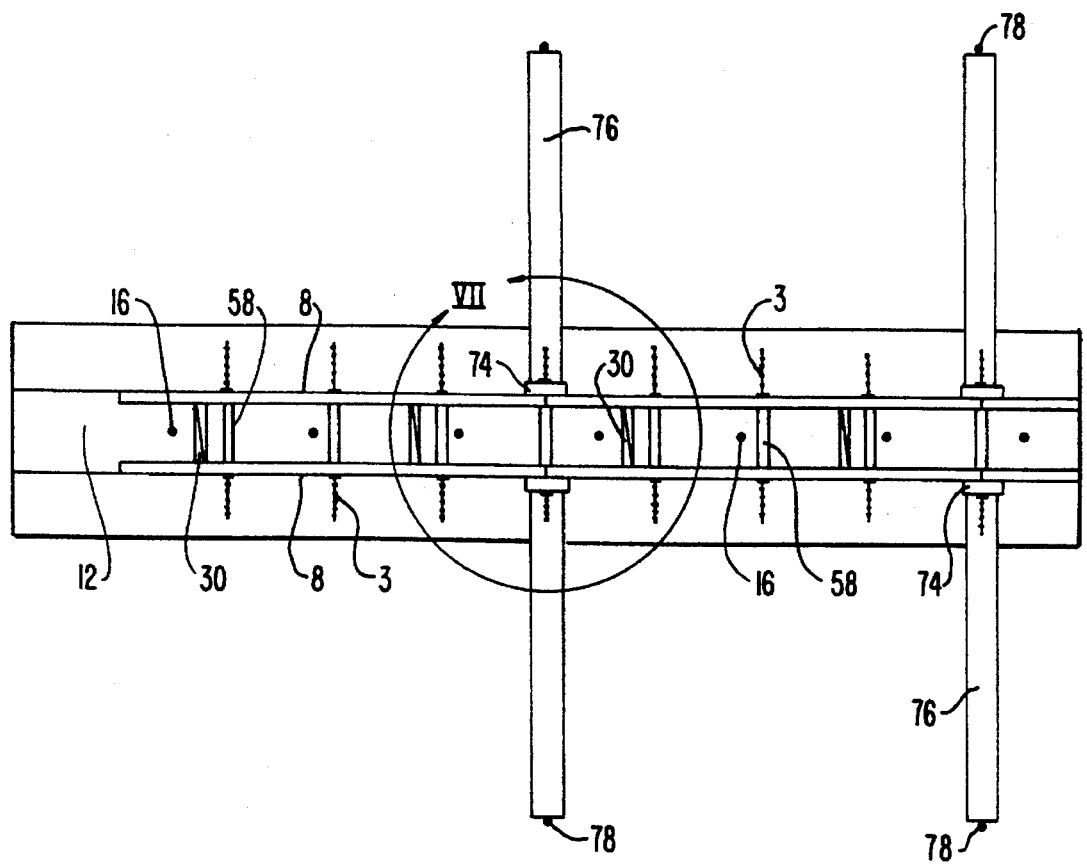
FIG. 24 is a plan view of erected sets of fiberglass reinforced cement boards butted together, appropriately braced and ready for pouring the fiber-foam cement core materials.

Referring to FIG. 24, temporary bracing is then placed at all panel-to-panel joints and in all corners, inside and outside. This includes vertical bracing 74, knee-bracing 76 and appropriately anchored (e.g. driven into the ground) rods or form pins 78.

Figure 25:
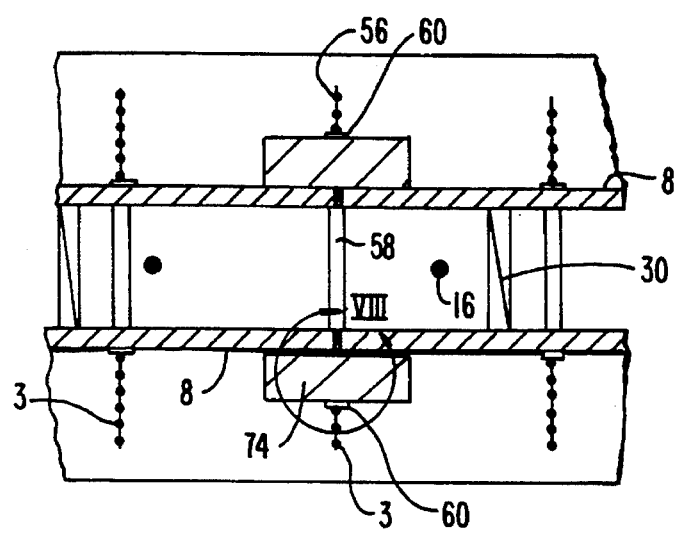
FIG. 25 is an enlarged plan view of the area encircled by line "VII" in FIG. 24.
Figure 26:
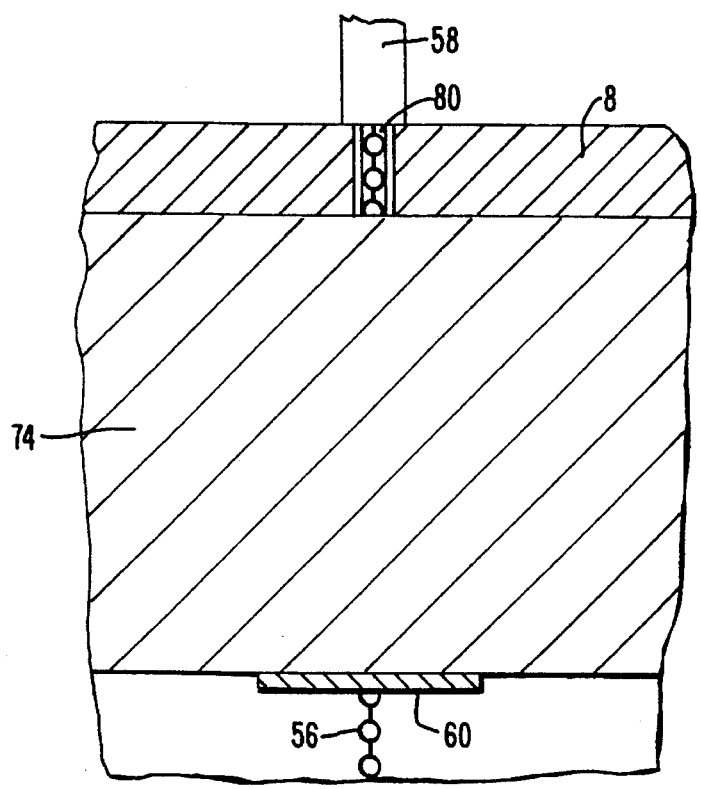
FIG. 26 is an enlarged plan view of the area encircled by line "VIII" in FIG. 25.

Referring to FIGS. 25 and 26, the vertical bracing 74 includes battens supported by knee bracing 76 and drilled to accept tie assemblies 3. Tie assembly holes drilled through the vertical battens are preferably spaced (vertically) at the same intervals as the tie holes 70 through the fiberglass reinforced cement boards 8. FIG. 26 illustrates the manner in which the vertical battens close and seal the panel-to-panel joints to prevent leakage of the uncured core fill. When the core fill is poured, the narrow space 80 between the panels will be filled by it, which bonds the edges of adjoining cement boards together. After removal of the ties and battens, a smooth surface remains, thereby reducing the need for joint treatment, patching and filling.

FIG. 26 illustrates the manner in which the cement boards 8 are "squeezed" between the slotted spacers 58 and the vertical battens 74. Plastic ties 3 hold the assembly in place. The small gap 80 between the panel edges which becomes filled with materials from the fiber-foam core and bonds the panel edges together is readily seen in FIG. 26.

Figure 27:
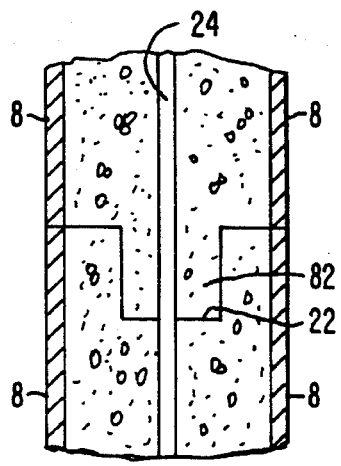
FIG. 27 is an enlarged, fragmentary section of the connection between lower and upper walls constructed in accordance with the invention and shows the manner in which the connection is stiffened with vertical steel dowels.

An important aspect of the present invention is the seismically strong connection made between a given wall and the ground, foundation or wall below or above it. This is primarily accomplished by locking the wall into a continuous channel or slot. In FIG. 27, the boundary of the continuous slot 22 formed at the top of the lower wall receives, and after curing becomes bonded to, a corresponding protrusion 82 depending from the upper wall. Vertical steel rods 24 provide additional strength.

Figure 28:
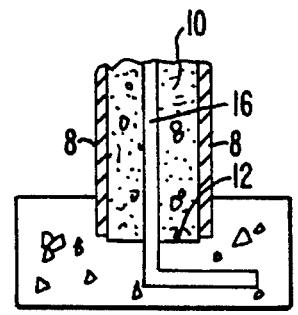
FIG. 28 is an enlarged, fragmentary view, in section, of the continuously slotted concrete footing encircled by line "III" in FIG. 4 and shows how the base of the entire wall seats into the slot.

FIG. 28 shows the manner in which a continuous slot 12 in a foundation footing, a foundation slab or atop a foundation stem wall anchors the wall. The vertical rods 24 are bent 90° to lock them into the footing. For stem walls topped by a continuous slot (not shown), the rod remains straight.

Figure 29:
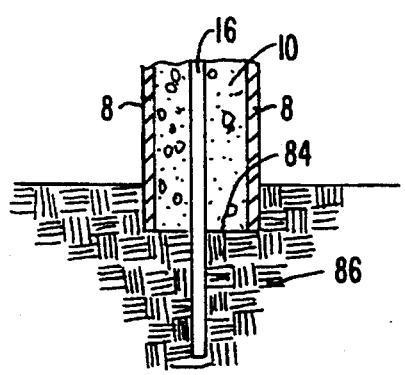
FIG. 29 is similar to FIG. 28 and shows the manner in which the wall can be seated and anchored in a trench formed in compact earth.

FIG. 29 shows the manner in which a wall can be formed over a trench 84 with a series of vertical rods 24 embedded into compact earth 86. The vertical rods can be driven in place or grouted into drilled holes.

In each of these embodiments, the trench 84 or continuous slots 12, 22 position the vertical wall boards 8 prior to and during the placement of the core fill material, eliminating the need for special fittings. The continuous slots or trench also prevent leakage of the fill material during the pour because the weight of and pressure generated by the material between the boards firmly presses them against the sides of the slot or trench and thereby prevents leakage. This eliminates the need for gaskets and sealants. Finally, the trench or slot acts to keep the wall from moving during strong seismic events or in high winds.

Figure 31:
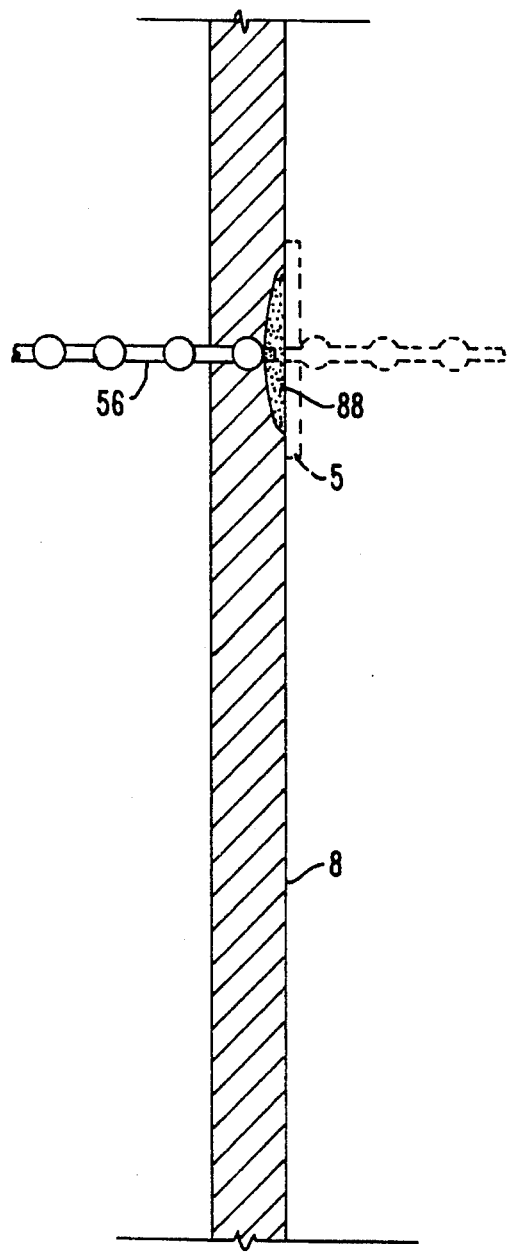
FIG. 31 is an enlarged sectional view of the area encircled by line "I" in FIG. 3.

After the fiber-foam cement core materials have been poured and had time to cure, the wall is ready for finishing. First, the temporary bracing is removed. Next the tie plates 60 (or 66) are removed as schematically shown in FIG. 31. A hammer is now employed to dimple the faces of the cement board 8 from where the ties 3 protrude. A single hammer blow creates a usually sufficient, slight depression 88. The ties 56 (or 62) are cut or nipped off at the deepest part of the depression, using a knife, a chisel or a pair of end cutters. Then the depression is filled flush with the wall surface, in the same manner as is done when filling screw or nail head depressions in a gypsum drywall. The filler should be of a material approved by the manufacturer of the cement board for that purpose. The wall is now ready for paint or other finish.

Figure 32:
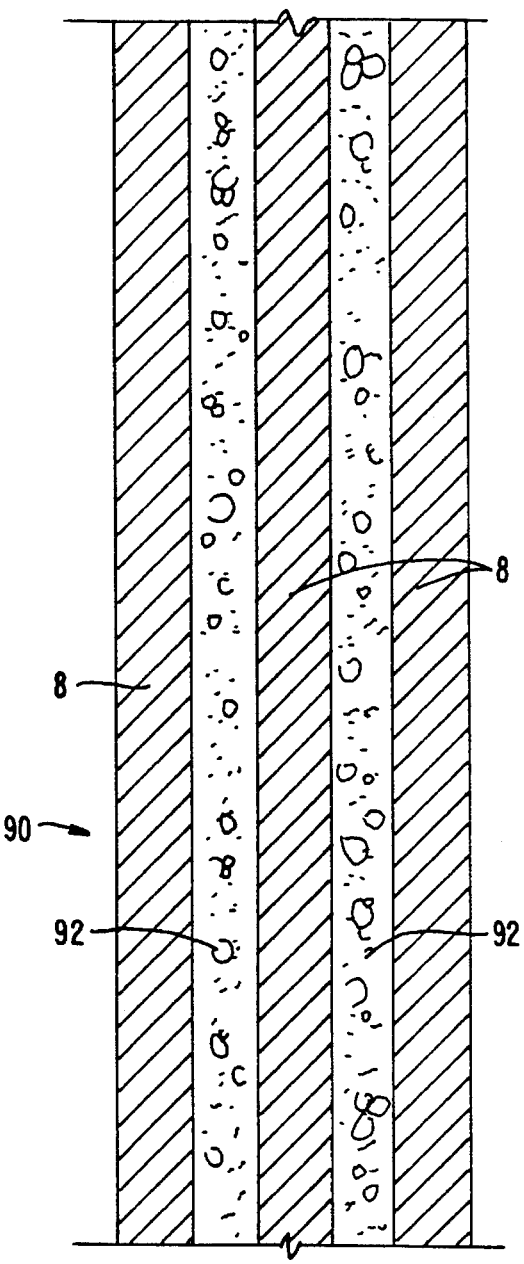
FIG. 32 illustrates in section a laminated beam or girder constructed in accordance with the invention.

Although ledgers or rim joist 20 have thus far been illustrated and described as being made of wood, structural members such as these can also be made in accordance with the present invention. FIG. 32 illustrates a beam 90 made in this manner. Three fiberglass reinforced cement boards 8 are bonded together by fills 92 of the same fiber-foam cement core materials used to fill wall cavities. Such beams and similar structures can be made with as many laminates as needed to create structural beams, girders and shapes having the desired strength. Additional layers of fiberglass reinforced cement boards may also be inserted into wall cavities at areas requiring increased structural strength (not shown). Care should be taken, however, to ensure that a constant distance is maintained between these additional laminates, themselves, and between them and outer wall skins so as to provide a large enough space for fill materials to enter and bond to all surfaces.

Figure 33:
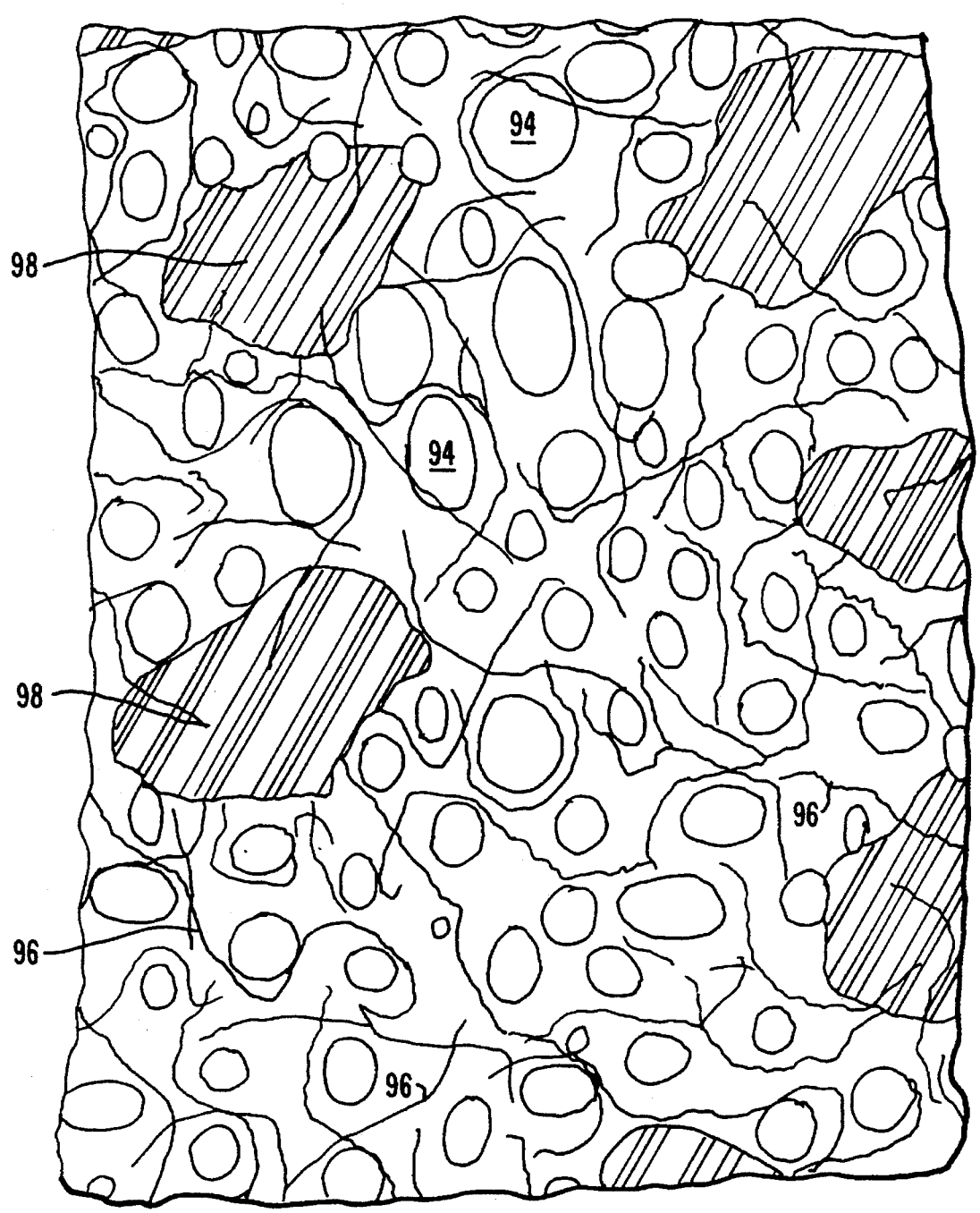
FIG. 33 depicts an enlarged microscopic cross-sectional view of the fiber-foam cement core and how the materials thereof interact to create a matrix combining characteristics of solids and foams into one uniform, homogeneously bonded, solid structural material.

The superior structural strength of walls and structures constructed in accordance with the invention results from the intimate bonding between the nylon fibers, the protein and water foam, the particulates in the designed mix, and the migration of these materials into the interstices between the aggregates and fiberglass roving of the fiberglass reinforced cement board panels. FIG. 33 is a low-magnification drawing which schematically illustrates the manner in which this occurs at the surface of the cement boards. Cells 94 are small air bubbles whose surface tension is maintained by the protein-based Neopor brand foaming agent. Surrounding cells 94 are particles of whatever materials are included in the mix. Generally, these particles are Type II Portland cement, with or without certain clays and smokestack fly ash. Clay/fly ash mixes and cement/fly ash mixes can also be used. A multiplicity of relatively short fibers 96 wrap around and embrace, rather than pierce, the cells, thereby forming a netlike lattice which significantly enhances the strength of the core. Hydrostatic pressure forces these materials against the porous faces of the cement boards and causes them to migrate into the boards. The particulate and proteinaceous materials in the core fill surround sand, expanded shale and other aggregates 98 of the cement boards and gradually fill the open pores and passages between them.

Figure 34:
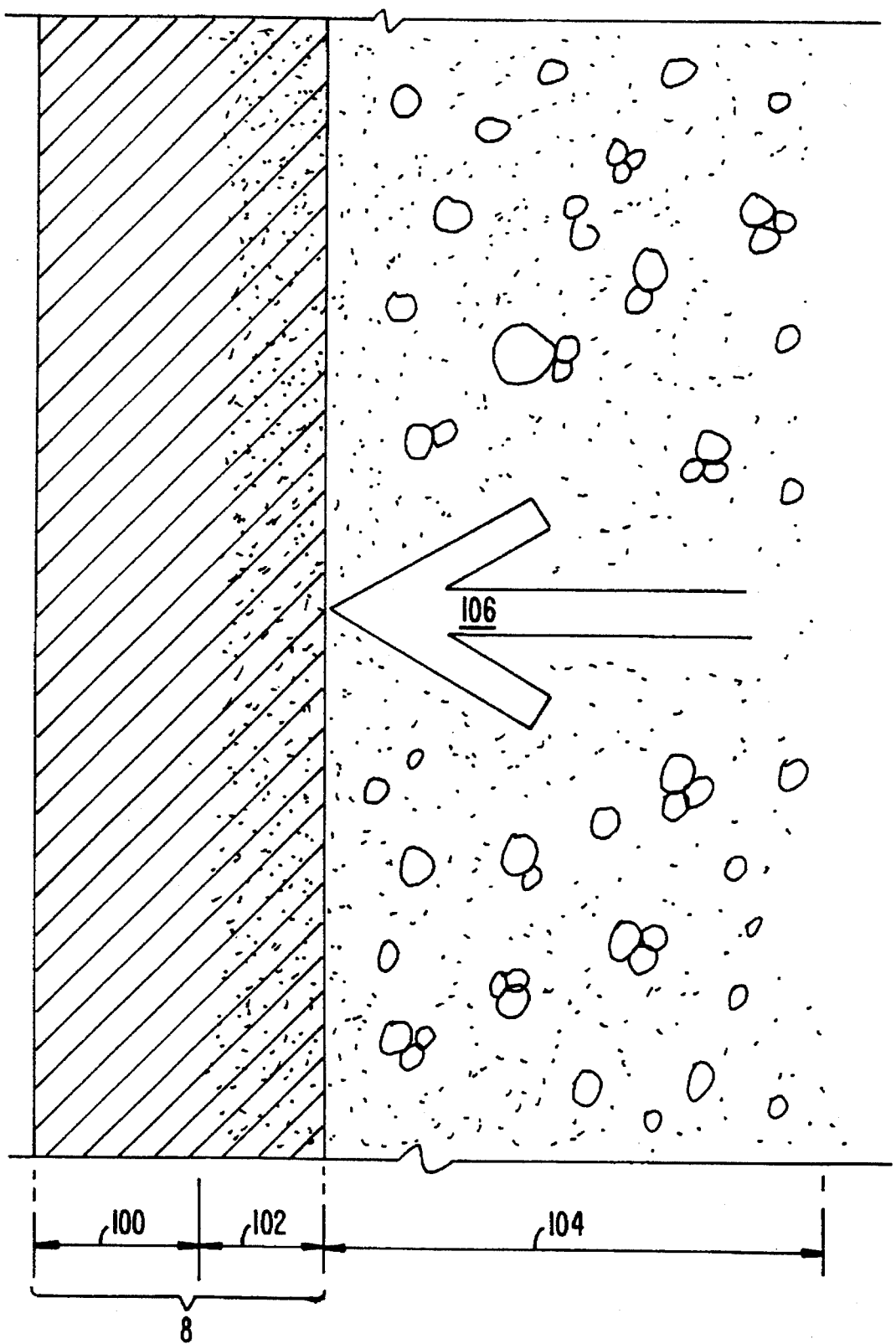
FIG. 34 schematically illustrates the process which causes the proteinaceous liquids and the finest particulates of the fiber-foam cement core materials to migrate into the voids and interstices of the fiberglass reinforced cement board, creating a homogeneously bonded, monolithic structure with greater shear and compressive strengths than those of the component materials individually.

FIG. 34 illustrates this process in more detail. Cement board 8 forms zones 100 and 102 exhibiting most material migration into the board and the greatest density of the core fill materials. In zone 100, the cement board is only partially penetrated by core fill materials. In zone 102, the hydrostatic pressure of the fill causes some of the air cells formed by the foam to collapse, releasing their air and permitting surrounding fill material to flow liquid and particulate materials into the pores and interstices of the cement board. As these pores and interstices begin to fill, they gradually close and fewer particulates and liquids are able to move past them. As the mix cures and dehydrates, the flow decreases and finally stops.

Before complete closure of these migratory pathways, some of the fine, 2.5 denier fibers are forced part way into the cement board. As a result of this cellular collapse along the face of the cement board, the material density and the strength of the bond is highest in the zone marked 102. Zone 104 is the main body of the fiber-foam cement core 10. In this area of the core, the density is slightly lower than at the board/core interface, thereby reducing the capacity of the material to transfer thermal and acoustical energy. The arrow 106 indicates the direction of flow of the core materials into the cement board 8.

The fiber-foam cement core fill materials should be properly mixed so that they have a consistency similar to that of pancake batter. It should be very fluid to permit it to readily enter into every part of the cavity formed by the spaced-apart cement boards; the material should be able to flow through it unrestricted until the fill has reached the tops of the panels. Because the fiber-foam is so highly flowable, no screeding is required at the wall tops. If continuous slots are to be formed into the wall tops, then they should be blocked before the pour commences. The fiber-foam can be pumped into the formed structure by means of a standard rotary, masonry grout pump and can be poured at the highest possible operating rates of the pumping unit. The discharge end of the pump hose should be placed at the bottom of the form and gradually raised as the level of fill materials rises during pouring. The fiber-foam cement core fill materials may be poured at any temperature below 130° and above −25° F.

Fiber-foam mix designs should be laboratory tested to provide no less than thirty-five pounds per square inch of compressive strength at seven days. The following Table 1 shows a typical mix design, preferred for single-story buildings, that produces a wall core fill with the desired characteristics.

TABLE 1

| 25 PCF MIX - 1 CU. YD. | |
| --- | --- |
| MATERIAL | QUANTITY |
| Cement (lbs.) | 505.0 |
| Water (gals.) | 21.7 |
| Foam (gals.) | 161.0 |
| Water in Foam (gals.) | 12.4 |
| Neopor* in Foam (gals.) | 0.3 |
| DuPont P732, 0.83" | |

TABLE 1-continued

25 PCF MIX - 1 CU. YD.

| MATERIAL | QUANTITY |
|---|---|
| Nylon Fiber (lbs.) | 1.0 |

*Neopor is a trademark for a particularly useful foaming agent commercially available from Neopor Inc. of Vail, Colorado.

The mix should be prepared according to the manufacturer's recommendations. Typically this means that the ratio of potable water to Neopor foaming agent should be about 40:1 by volume. The expansion ratio of the finished foam to the foaming agent mixture should be maintained between 13.3:1 and 15.5:1. The Neopor foam must be of uniform quality and generated according to the recommendations of the Neopor manuals and guides. Neopor is mixed with water and foamed in a conventional foam generator. The resulting foam is then mixed with the cement and the nylon fibers to prepare the core mix. Cement must be a consistent, high-quality Type II Portland cement. Mix designs should, as mentioned earlier, be laboratory tested to ascertain that seven-day compressive strengths of not less than thirty-five pounds per square inch are achieved.

While a typical structural concrete wall will weigh approximately one hundred sixty-five pounds per cubic foot, a wall constructed in accordance with the invention; i.e. including a core with the above-stated core mix and cement boards on each side of the core, weighs approximately thirty-nine pounds per cubic foot. The fiber-foam cement core material is not a structural concrete, but an insulating, structural fill and, with mix designs similar to the one listed above, is generally suitable only for wall fills in accordance with the invention and not by itself.

The strength of the wall can be increased; e.g. for multi-story buildings, by increasing the density of the core fill. The following Table 2 shows various core densities, in their dried, cured state, and the proportions of mix materials required to attain such densities.

TABLE 2

| MATERIAL REQUIREMENTS FOR ONE CUBIC YARD | OVEN DRY DENSITY LBS. PER CUBIC FOOT | | | | | | | |
|---|---|---|---|---|---|---|---|---|
| | 25 | 50 | 60 | 70 | 80 | 90 | 100 | 110 |
| Sand, Lbs. - Note 1 | 0 | 708 | 940 | 1190 | 1432 | 1665 | 1910 | 2180 |
| Cement, Lbs. - Note 2 | 505 | 540 | 580 | 600 | 620 | 648 | 675 | 700 |
| Water in Slurry, Gals. | 24 | 25 | 28 | 31 | 33 | 35 | 38 | 40 |
| Nylon fiber, Lbs. | 1 | 1 | 1 | 1 | 1 | 1 | 1 | 1 |
| Foam, Gals. | 162 | 127 | 116 | 101 | 86 | 71 | 58 | 44 |
| Water in Foam, Gals. | 12 | 9.5 | 8.6 | 7.6 | 6.4 | 5.3 | 4.3 | 3.2 |
| Foaming Agent, Gals. | 0.300 | 0.238 | 0.215 | 0.190 | 0.160 | 0.133 | 0.108 | 0.080 |
| Water/Cement Ratio | 0.57 | 0.49 | 0.47 | 0.48 | 0.47 | 0.46 | 0.45 | 0.44 |
| Percentage of Air in Mix | 80 | 63 | 57 | 50 | 42 | 35 | 29 | 22 |
| Total Weight, Lbs. | 808 | 1536 | 1823 | 2109 | 2398 | 2645 | 2940 | 3241 |
| Total Volume, Cubic Feet | 27.1 | 27.0 | 27.3 | 27.3 | 27.1 | 27.0 | 27.0 | 27.1 |
| Wet Density, Lbs./Cubic Foot | 29.9 | 56.9 | 67.5 | 78.1 | 88.8 | 98.0 | 108.9 | 120.0 |
| Air Dry Density, Lbs./Cubic Foot | 25.4 | 52.4 | 62.1 | 72.6 | 83.3 | 93.5 | 103.9 | 114.8 |
| Compressive Strength, psi - Note 3 | 45.6 | 156.0 | 242.0 | 391.0 | 635.0 | 1011.0 | 1593.0 | 2503.0 |

Note 1 - Sands vary in nature substantially and should be tested for cleanliness and porosity. Washed, river sand ranging in size from standard sieve no. 200 to no. 4 in preferred with at least 70% passing through no. 30 (70% fines). Water content will vary depending upon surface area and absorbency of sand.
Note 2 - Type II Portland.
Note 3 - Approximate values.

What is claimed is:

1. A building structure comprising first and second, spaced-apart boards defining an interior space between them, the boards having open pores and interstices extending from surfaces thereof facing the interior space into the boards permitting flowable materials to penetrate a substantial distance into the boards, and a lightweight core formed of a mixture comprising at least cured cement, a multiplicity of closed voids distributed throughout the core, and a multiplicity of relatively short plastic fibers distributed throughout the core, some of the cured cement of the core and some of the fibers extending past the surfaces a substantial distance into the boards to form a uniform, high-strength bond between the core and the boards.

2. A building structure according to claim 1 wherein the boards comprise porous, fiberglass reinforced cement boards.

3. A building structure according to claim 1 wherein the structure is a building wall and including a plurality of sets of spaced-apart first and second boards, the plurality of boards being in horizontal alignment with each other and spaced apart so that edges of the boards define an upright gap between adjacent first boards and adjacent second boards, and wherein the mixture of the core fills the gaps and forms a bond with the board edges.

4. A building structure according to claim 1 including a sealant applied to exterior surfaces of at least one board facing away from the interior space for preventing the flowable materials from penetrating the board past the exterior surface.

5. A building structure according to claim 1 wherein the fibers comprise nylon fibers.

6. A building structure according to claim 5 wherein the nylon fibers have a length of less than one inch.

7. A building structure according to claim 6 wherein the nylon fibers have a length of no more than about 0.83 inch.

8. A building structure according to claim 1 wherein the structure is a building wall and including a support surface for carrying the wall, the support surface defining a channel forming a channel base and upright channel sides, and wherein outer surfaces of the boards facing away from the interior space abut the channel sides.

9. A building structure according to claim wherein the support surface is formed by compacted ground, and wherein the channel is formed in the ground.

10. A building structure according to claim 8 wherein the support surface is defined by concrete, and wherein the channel is formed in the concrete.

11. A building structure according to claim 1 wherein said structure is a building wall defined by a first, lower wall section and a second, upper wall section disposed on top of the first wall section, the second section comprising third and fourth porous boards placed on top of and in surface alignment with the first and second boards and defining a further interior space between them aligned with the first-mentioned interior space, the third and fourth boards also having porous surfaces facing the further interior space, and a further lightweight core formed of a mixture comprising at least cured cement, a multiplicity of closed voids distributed throughout the further core and a multiplicity of relatively short plastic fibers distributed throughout the further core, some of the cured cement of the further core and some of the fibers in the further core extending into the third and fourth boards past their porous surfaces to form a uniform, high-strength bond between the further core and the third and fourth boards, and anchoring means located between the first and second wall sections preventing relative lateral movements between them in a direction transverse to the boards.

12. A building structure according to claim 11 wherein the lateral anchoring means includes a channel formed in an upwardly facing surface of the first-mentioned core and a protrusion disposed in the channel formed by the further core.

13. A building structure according to claim 11 wherein the lateral anchoring means includes a uniform bond between the channel and the protrusion formed solely by materials of the cores.

14. A building structure according to claim 11 wherein the lateral anchoring means comprises a plurality of spaced-apart metal rods extending from the first-mentioned core into the further core, the metal rods being embedded in said cores.

15. A building structure according to claim 1 including a plurality of spacers in the interior space having ends in contact with the porous board surfaces, and connecting means in a vicinity of the spacers biasing the boards against the spacers; whereby the spacers and the connecting means secure the boards to each other in their desired relative positions to define the interior space into which uncured, fluid core mix materials can be placed for subsequent curing to form the core and bond the core to the porous board surfaces.

16. A building structure according to claim 15 wherein the spacers and the connecting means are constructed of a plastic material to reduce heat transfer between the boards.

17. A building structure according to claim 15 wherein the spacers and the connecting means are at least partially constructed of materials selected from the group consisting of wood, bamboo, reed and hemp twine.

18. A building structure according to claim 15 wherein the boards have outer surfaces facing away from the inner space, and wherein the connecting means is recessed from the respective outer surfaces of the boards so that no part of the connecting means protrudes past the outer surfaces.

19. A building structure according to claims 15 wherein the boards have outer surfaces facing away from the inner space, and wherein the connecting means includes a string portion and at least two knot portions carried by the string portion, the knot portions being spaced apart a distance no less than a distance between outer surfaces of the boards.

20. A building structure according to claim 15 wherein the string portion and the knot portions are made of a single piece of uniform material.

21. A building structure according to claim 20 wherein the string portion and the knot portions are constructed of a plastic material.

22. A building structure according to claim 21 including multiple knot portions arranged over the length of the string portion, some of the knot portions being embedded in the core.

23. A building structure according to claim 15 wherein the connecting means includes elongated ties extending through the boards and the core, and wherein the spacers at least partially surround the tie.

24. A building structure according to claim 23 wherein the spacer is trough-shaped and wherein the tie is disposed inside a trough formed by the spacer.

25. A building structure according to claim 1 wherein the structure is a building wall and wherein the wall defines a first, lower wall section, and including a second, upper wall section constructed identically to the first wall section and disposed on top of the first wall section so that the sections form a multi-story wall, and including a horizontally oriented ledger board disposed in a vicinity of where the first and second wall sections meet, and means for securing the ledger board to an outer surface of at least one board facing away from the interior space.

26. A building structure according to claim 25 wherein the ledger board overlies a joinder line between the first and second wall sections.

27. A building structure according to claim 25 wherein the securing means includes a plurality of threaded bolts each having a free end projecting from the board and including a portion embedded in and thereby secured to the core, the free end protruding past the ledger board and nut means carried by the bolt and tightened against the ledger board to thereby secure the ledger board to the multi-story wall.

28. A building structure according to claim 27 wherein both free ends of the bolts protrude past the porous boards of the multi-story wall, and including horizontal ledger boards on both sides of the multi-story wall carried by respective ends of the protruding bolts, and nut means securing each ledger board to the bolts and therewith the multi-story wall.

29. A building structure according to claim 27 including a saddle plate embedded in the core of at least one of the wall sections, the saddle plates including cutouts extending substantially parallel to the porous boards and filled with the mixture forming the core, and means securing the saddle plate to the porous surface of at least one of the boards until after the mixture forming the core has been poured and cured.

30. A building structure according to claim 29 including a saddle plate for each threaded bolt, the saddle plates being embedded in the cores of the upper and lower wall sections and including means for engaging the bolts, whereby the saddle plates support the bolts until after the core has been poured and cured.

31. A building structure according to claim 30 wherein the securing means includes a hole in each saddle plate oriented perpendicular to the boards, the hole intersecting the cutouts and the bolt being disposed within the hole and extending into the cutout so that said portion of the bolt is embedded in a portion of the core filling the cutout.

32. A building comprising a substantially horizontal support surface; a continuous, upwardly open channel formed in the support surface, bounded by upwardly oriented channel sides and arranged so that the channel coincides with the location of a desired building wall; upright, opposing fiber-reinforced, porous cement boards having open pores extending from surfaces of the boards into their interiors which can be penetrated by flowable materials, the boards having lower end portions disposed in the channel and in contact with the channel sides, spacers between opposing boards, and tie means in a vicinity of the spacers and extending through substantially aligned holes in the cement boards from one cement board to the other; and a solid core disposed in an interior space between the opposing cement boards, the core being formed by pouring a fluid core mix including cement, a foam and relatively short nylon fibers into the interior space, the cement having cured, a portion of the core mix including at least some cement and some fibers being disposed in the pores of the cement boards, the some fibers protruding from the pores into the solid core so that a uniform, intimate bond is formed between the solid core and the cement boards, whereby the boards and the core define a homogeneous building wall over the length of the channel.

33. A building according to claim 32 including a layer of a sealant applied to a side of at least one of the cement boards facing away from the other board for preventing flowable materials from flowing past the side of the board.

34. A building according to claim 32 wherein the channel is recessed into the support surface.

35. A building according to claim 32 wherein the channel comprises a plurality of channel sections, at least one of the sections being angularly inclined relative to another channel section, and wherein the homogeneous building wall extends over the plurality of channel sections.

36. A building comprising a support surface defining a plurality of continuous, upwardly open channel sections bounded by lateral, spaced-apart, upright channel side walls, at least one channel section being angularly inclined relative to another channel section, and a homogeneous building wall extending upwardly from the channel sections and exhibiting a substantially uniform rate of thermal expansions and contractions when subjected to temperature changes; the wall including spaced-apart, outer, fiber-reinforced, porous cement boards aligned with the channels and a fiber-foam cement core filling an interior space between the spaced-apart cement boards and extending from a base of the channel sections to a top of the boards; the cement core being formed in situ in the interior space and comprising cured cement; a foam forming a multiplicity of voids distributed throughout the core; and a multiplicity of relatively short nylon fibers, at least some of the cement and some of the fibers being disposed in pores of the cement boards, the at least some of the fibers extending partially from the cement board into the core so that materials of the core and the boards only form an intimate and uniform bond between the core and the boards; whereby the generation of temperature induced stresses and cracks resulting therefrom in the wall are substantially prevented.

37. A building according to claim 36 including a layer of a sealant applied to sides of the cement boards facing away from the interior space to prevent materials of the cement core while formed in situ from penetrating the boards past their exterior sides.

38. A method of constructing a building wall comprising the steps of:

(a) providing a set of first and second boards, each board having open pores extending from at least one porous surface a substantial distance into an interior of the board so that flowable materials can penetrate a substantial distance into the boards;

(b) positioning the boards so that the porous surfaces face each other;

(c) placing a plurality of spacers between the opposing porous surfaces;

(d) biasing the boards against the spacers so that the boards define a casting form with an interior space between them;

(e) pouring into the interior space a fluid mix comprising at least cement, a foam equally distributed through the mix so that, upon pouring, the mix disposed in the space includes a multiplicity of closed voids, and a multiplicity of relatively short plastic fibers throughout the mix;

(f) penetrating the pores in the boards with at least some cement and some fibers a substantial distance into the boards so that portions of the at least some fibers extend from the interior of the boards into the fluid mix in the interior space; and (g) curing the mix to form a solid core and an intimate, uniform bond between the solid core and the boards and thereby complete the wall.

39. A method according to claim 38 including the step of applying bracing to exterior walls of the boards facing away from the interior space to support the boards and maintain the boards in their desired positions over their full height during the pouring and curing steps.

40. A method according to claim 38 wherein the boards comprise fiber-reinforced, porous cement boards, and including, after the curing step, the step of applying a mechanical fastener selected from the group consisting of nails and screws directly into the porous cement board.

41. A method according to claim 38 including the steps of repeating steps (a)–(d) prior to the pouring step to form a second set of interconnected boards, thereafter moving the first-mentioned set of boards adjacent the second set of boards so that edges of the boards in the respective sets are opposite each other and form gaps between them, sealing the gaps in substantial alignment with exterior sides of the boards of the sets facing away from the respective interior spaces between the boards of the sets, and thereafter performing steps (e)–(g) with respect to the interior spaces defined by the sets of boards including the gaps, whereby, following the curing step, a homogeneous wall is formed by the sets of boards and the solid core therein and an exterior surface of the wall defined by the exterior board surfaces and cured fluid mix in the gaps is substantially continuous and smooth.

42. A method according to claim 41 wherein the step of positioning comprises the step of angularly inclining the boards of the first-mentioned set relative to the boards of the second set in a substantially horizontal plane.

43. A method according to claim 38 including the step of preventing a penetration of the boards by the at least some cement and the some fibers past exterior surfaces of the boards facing away from the interior space.

44. A method according to claim 43 wherein the step of preventing comprises the step of applying a sealant to the exterior surfaces of the boards.

45. A method according to claim 38 including the step of moving the boards and the spacers as a unit to a desired location for the wall after the step of biasing and prior to the step of pouring.

46. A method according to claim 45 including the step of forming a channel in a support surface for the wall, the channel having a width substantially equal to a spacing between exterior surfaces of the boards facing away from the core, and wherein the step of moving includes the step of placing lower end portions of the boards into the channel.

47. A method according to claim 46 wherein the step of forming the channel comprises the step of forming the channel so that the boards can gravitationally drop into the channel during the moving step, and including the step of sealing the interior space from the exterior along the channel by biasing the lower end portions of the boards into intimate contact with upright sides of the channel to prevent a migration of the fluid mix out of the channel during the pouring and curing steps.

48. A method according to claim 38 including the step of repeating steps (a)–(d) with a second set of opposed boards; thereafter placing the second set of boards on top of the previously formed wall, and thereafter repeating steps (e)–(g) so that the fluid mix poured into the interior space between the second set of boards contacts and therewith bonds to an upper surface of the solid core between the first-mentioned set of boards, whereby a multi-story wall is completed.

49. A method according to claim 48 including the step of mechanically anchoring the cores between the first-mentioned set and the second set of boards to each other.

50. A method according to claim 49 wherein the step of anchoring comprises the steps of forming an upwardly open channel in an upper surface of the core between the first-mentioned set of boards, forming a correspondingly shaped protrusion in a lower end of the core between the second set of boards, and extending the protrusion into intimate contact with surfaces defining the channel.

51. A method according to claim 48 including the step of inserting a plurality of threaded bolts in a substantially common horizontal plane from an exterior of the multi-story wall into the solid core between one of the sets of boards so that a free end of each bolt protrudes from the multi-story wall, embedding a portion of each bolt in the fluid mix so that, after the curing step, the portion becomes secured to the core, placing a ledger board over the free ends of the bolts, and with the bolts mechanically securing the ledger board to the multi-story wall so that an upper floor can be supported on the ledger board.

52. A method according to claim 51 including the step of supporting parts of the bolts disposed in the interior space in a substantially horizontal orientation prior to and during the pouring and curing steps.

53. A method according to claim 52 including the step of positioning substantially horizontally oriented metal reinforcing rods extending substantially over a length of the multi-story wall and in a vicinity of a joinder line between the first-mentioned and second sets of boards and in a vicinity of the joinder line, and supporting the positioned metal rods prior to and during the pouring and curing steps so that the rods become fully embedded in the core between at least one of the sets of boards for seismically strengthening the multi-story wall.

54. A method according to claim 38 wherein the step of biasing comprises the step of extending an elongated member through the boards and the interior space so that ends of the member project past outer surfaces of the boards facing away from the internal space, applying tension to the member and transferring tension forces in the member to the exterior sides of the boards to thereby bias the boards against the spacer, and, after curing, severing the ends of the members at points inward of the outer board surfaces.

55. A method according to claim 54 including the step of at least partially surrounding the member with the spacer, and wherein the pouring step comprises substantially fully embedding the member and the spacer in the poured fluid mix.

56. A method according to claim 54 including the step of constructing the member and the spacer of a plastic material.

57. A method according to claim 54 including the step of forming the member and the spacer of organic materials naturally growing where the wall is being erected.

58. A method according to claim 57 including the step of selecting the organic materials for the member and the spacer from the group consisting of wood, bamboo, reed and hemp twine.

59. A method according to claim 54 including the step of filling cavities in the outer surfaces of the boards formed as a result of the severing step with a filler material so that the outer surfaces are substantially smooth and continuous.

60. method according to claim 59 wherein the boards are fiber-reinforced, porous cement boards, and including the step of forming a depression in the outer surfaces of the board surrounding the ends of the members prior to the step of severing.

61. A method according to claim 60 wherein the step of forming a depression comprises the step of applying at least one hammer blow to the board proximate each protruding member end.

62. A method of constructing a building having upright walls comprising the steps of:

(a) preparing a support surface for the walls;

(b) forming elongated channels having upright, laterally spaced sides on the support surface where walls are to be erected;

(c) assembling multiple sets of first and second, fiber-reinforced, porous cement boards face-to-face and firmly securing the board of each set in parallel, spaced-apart relationship to each other so that the sets form and can be moved as units and define a hollow interior space between the board of each unit, the boards being spaced so that a distance between their exterior surfaces facing away from the interior space is substantially equal to a spacing between the channel sides and permits the units to gravitationally drop into the channels, the boards being penetrable by flowable materials;

(d) positioning the units side-by-side in the channels so that opposing edges of the boards of adjacent units are separated by gaps;

(e) sealing the gaps over a height of the boards in substantial alignment with the exterior board surfaces;

(f) mixing a flowable core fill including cement, a foam, and relatively short nylon fibers so that a substantially homogeneous mix is formed which includes evenly distributed, closed voids and nylon fibers;

(g) pouring the flowable core fill into the interior spaces and the gaps defined by the units in the channels;

(h) causing the flowable core fill including at least cement and nylon fibers to enter past surfaces of the boards facing the interior spaces into an interior of the boards so that some of the nylon fibers have portions disposed in the interior of the board and in the interior spaces; and (i) thereafter curing the flowable core fill to form a lightweight, solid core including a multiplicity of evenly distributed closed voids and nylon fibers and the boards and the rigid core become intimately and uniformly bonded to each other and the cured core fill in the gaps bonds and thereby interconnects the opposing edges of adjoining boards and forms, with the exterior board surfaces, a substantially continuous, smooth exterior wall surface;

whereby temperature changes in the building walls cause substantially uniform thermal expansions and contractions therein to prevent the formation of temperature induced stresses and cracks in the building walls.

63. A method according to claim 62 including the steps of repeating steps (a)–(c) to form additional units, following step (i) placing the additional units side-by-side on top of at least one building wall so that opposing edges of the boards of the additional units are also separated by gaps to thereby define the location and height of an upper story building wall, and thereafter repeating steps (e)–(i) with respect to the additional units to complete the multi-story building wall.

64. A method according to claim 62 wherein the support surface is defined by compacted ground, and wherein the step of forming the channel comprises the step of forming the channel in the ground.

65. A method according to claim 62, wherein the support surface is defined by concrete, and wherein the step of forming the channel comprises the step of forming the channel into the concrete.

66. A method according to claim 62 wherein the step of assembling comprises the step of placing spacers between the boards of the units and tieing the boards together against the spacers so that the boards, the spacers and the ties form the units, and fabricating the spacers and the ties from a non-metallic, thermally insulating material to thereby minimize heat transfers between the boards.

67. A method according to claim 62 including the step of preventing the flowable core fill from penetrating surfaces of the boards facing away from the hollow interior space.

68. A method according to claim 67 wherein the preventing step comprises the step of applying a sealant to the exterior surfaces.

* * * * *